(12) United States Patent
Kitazawa et al.

(10) Patent No.: US 12,318,992 B2
(45) Date of Patent: Jun. 3, 2025

(54) LAMINATED BODY AND FORMING METHOD

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 1 day.

(21) Appl. No.: 18/081,087

(22) Filed: Dec. 14, 2022

(65) Prior Publication Data

US 2023/0330913 A1    Oct. 19, 2023

(30) Foreign Application Priority Data

Apr. 15, 2022    (JP) .................... 2022-067675

(51) Int. Cl.
*B29C 53/06*    (2006.01)
*B29C 33/42*    (2006.01)

(52) U.S. Cl.
CPC .............. *B29C 53/06* (2013.01); *B29C 33/42* (2013.01)

(58) Field of Classification Search
CPC ......... B29C 53/06; B29C 33/42; B29C 53/04; B29C 70/081; B29C 70/30; C08J 5/04
See application file for complete search history.

(56) References Cited

U.S. PATENT DOCUMENTS

| | | |
|---|---|---|
| 10,105,940 B2 | 10/2018 | Chapman et al. |
| 2008/0268208 A1 | 10/2008 | Martin et al. |

(Continued)

FOREIGN PATENT DOCUMENTS

| | | |
|---|---|---|
| EP | 2156943 A1 | 2/2010 |
| EP | 2433781 A2 | 3/2012 |

(Continued)

OTHER PUBLICATIONS

European Patent Office, "Extended European Search Report with Search Opinion for European Patent Application 22214518.7," Oct. 10, 2023.

(Continued)

*Primary Examiner* — Christopher M Rodd
*Assistant Examiner* — Shibin Liang
(74) *Attorney, Agent, or Firm* — HAUPTMAN HAM, LLP

(57) ABSTRACT

A laminated body reference surface curved relative to the X-axis direction and overlapped on a shaping die reference surface and a laminated body bend surface intersecting the laminated body reference surface along the X-axis direction and overlapped on a shaping die bend surface are provided, the angle between the laminated body reference surface and the laminated body bend surface is larger than the angle between the shaping die reference surface and the shaping die bend surface. When a ridge where the shaping die reference surface and the shaping die bend surface intersect defines a shaping die edge, and a ridge where the laminated body reference surface and the laminated body bend surface intersect defines a laminated body edge, the laminated body edge is displaced from the shaping die edge on the shaping die reference surface with the laminated body reference surface being overlapped on the shaping die reference surface.

4 Claims, 22 Drawing Sheets

(56) References Cited

U.S. PATENT DOCUMENTS

| | | | |
|---|---|---|---|
| 2011/0186209 A1 | 8/2011 | Martin et al. | |
| 2012/0076989 A1 | 3/2012 | Bland | |
| 2014/0322381 A1 | 10/2014 | Bland | |
| 2017/0297317 A1 | 10/2017 | Chapman et al. | |
| 2018/0186101 A1 | 7/2018 | Ikeda et al. | |
| 2019/0077048 A1* | 3/2019 | Fujita | B29C 70/10 |
| 2019/0275750 A1 | 9/2019 | Parkingson et al. | |
| 2021/0331429 A1 | 10/2021 | Ikeda et al. | |
| 2023/0071796 A1* | 3/2023 | Shimizu | B29C 70/30 |

FOREIGN PATENT DOCUMENTS

| | | | |
|---|---|---|---|
| EP | 3321055 A1 | 5/2018 | |
| JP | 2012-071600 A | 4/2012 | |
| JP | 2018-012321 A | 1/2018 | |
| WO | 2017/007012 A1 | 1/2017 | |
| WO | 2021/157082 A1 | 8/2021 | |
| WO | WO-2021157106 A1 * | 8/2021 | B29B 11/16 |

OTHER PUBLICATIONS

Notice of Reasons for Refusal, Japanese Patent Application No. 2022-067675 dated Sep. 12, 2023, 4pp.

Notice of Reasons for Refusal, Japanese Patent Application No. 2022-067675 dated Jan. 9, 2024, 9pp.

* cited by examiner

FIG. 12
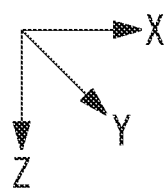
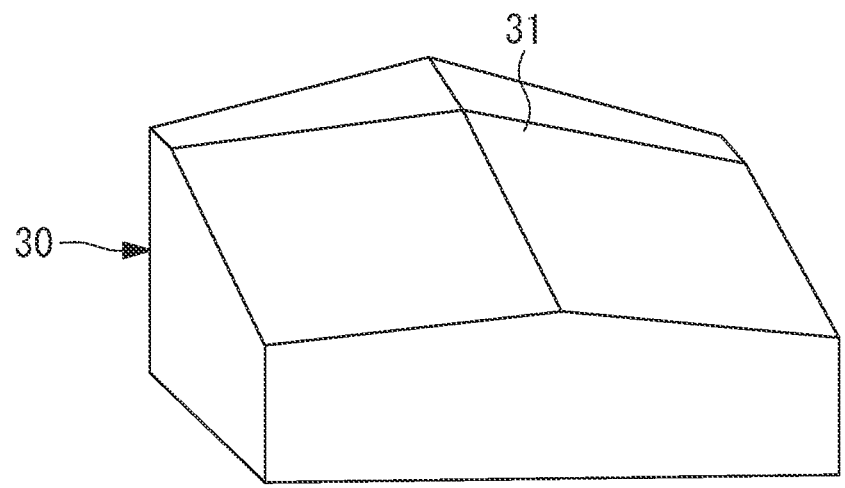

FIG. 16
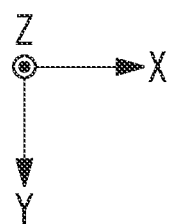
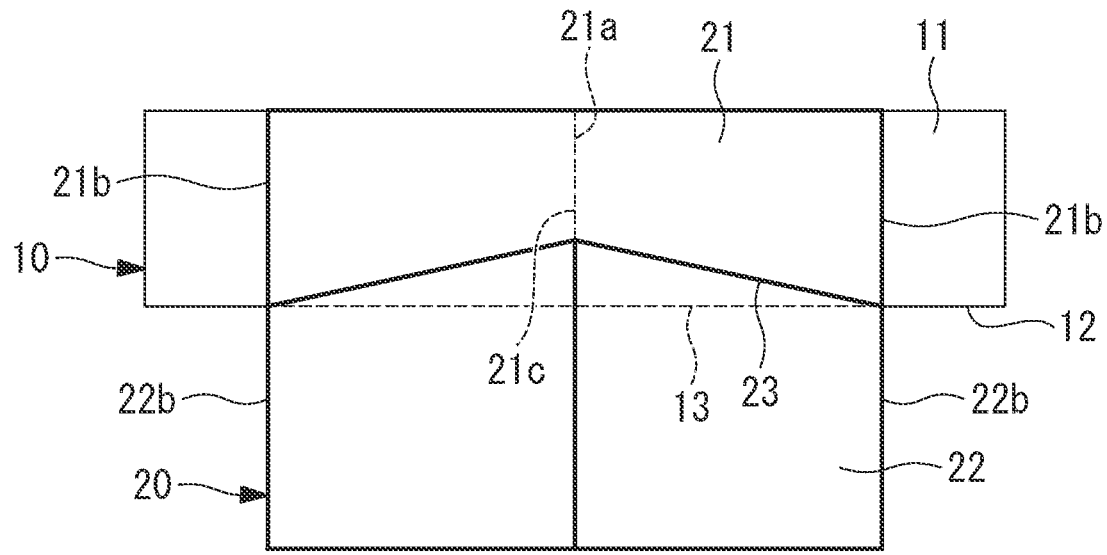

FIG. 20
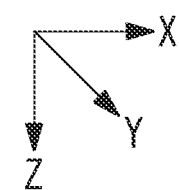
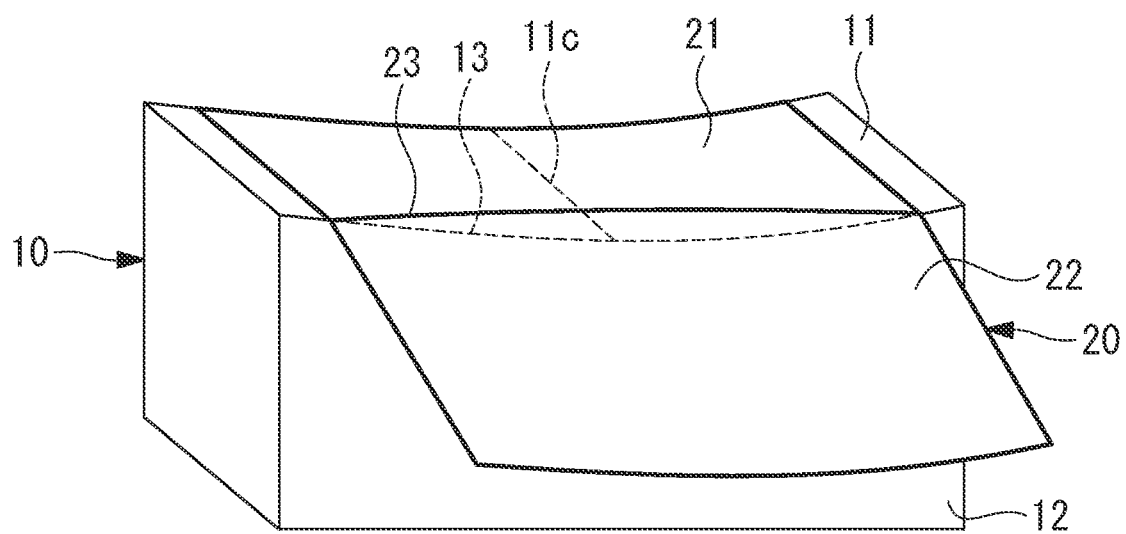

FIG. 22
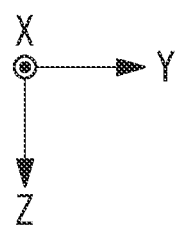
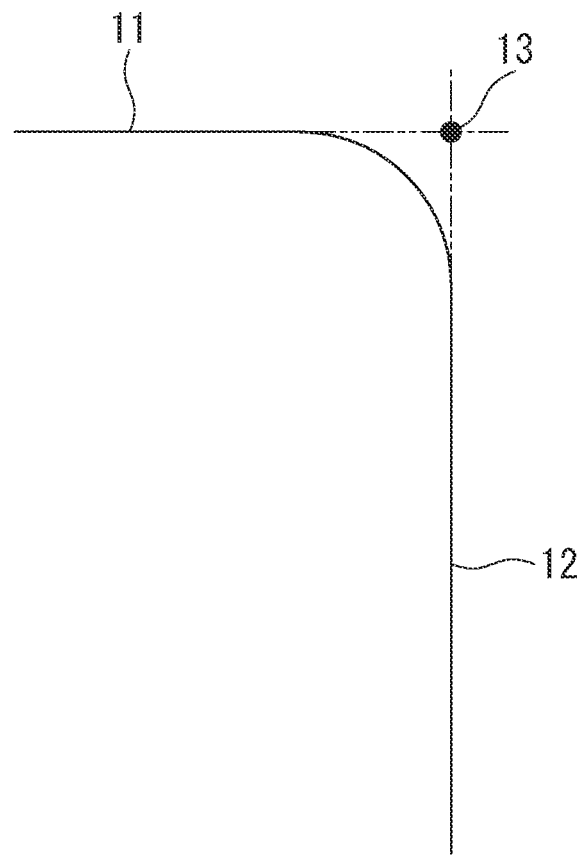

LAMINATED BODY AND FORMING METHOD

CROSS-REFERENCE TO RELATED APPLICATIONS

This application claims foreign priority benefits under U.S.C. § 119 to Japanese Patent Application No. 2022-067675 filed on Apr. 15, 2022, the contents of which is hereby incorporated by reference in its entirety.

BACKGROUND

1. Technical Field

The present disclosure relates to a laminated body and a forming method.

2. Description of Related Art

Some aircraft components such as a fuselage, a main wing, and the like of an aircraft are made of a composite material, for example, carbon fiber reinforced plastic (CFRP).

CFRP structure members (composite material structures) of aircraft components have various sectional shapes. One of the methods for manufacturing such a composite material structure is a method of laminating a plurality of fiber sheets (prepregs or the like) to fabricate a planar laminated body of fiber sheets (also referred to as a "charge") and forming this laminated body by using a shaping die to provide a desired sectional shape (for example, as in U.S. Pat. No. 10,105,940 and EP Patent Application Publication No. 2156943).

U.S. Pat. No. 10,105,940 discloses a method of laminating an extra laminated body on a portion where fiber sheets of a laminated body are expected to be insufficient when the laminated body is bent.

Further, EP Patent Application Publication No. 2156943 discloses a method of correcting an undevelopable surface to a developable surface by changing a bending line of a shaping die.

U.S. Pat. No. 10,105,940 and EP Patent Application Publication No. 2156943 are examples of the related arts.

However, in the method of U.S. Pat. No. 10,105,940, it is not possible to eliminate excess of a fiber sheet. Further, the method of EP Patent Application Publication No. 2156943 involves a change of the final shape of a product, which is not preferable.

BRIEF SUMMARY

The present disclosure has been made in view of such circumstances, and an object is to provide a laminated body and a forming method that can eliminate excess of a fiber sheet or insufficiency of a fiber sheet.

To achieve the above object, the laminated body and the forming method of the present disclosure employ the following solutions.

Specifically, the laminated body according to one aspect of the present disclosure is a laminated body configured to be overlapped on a shaping die having a shaping die reference surface curved or bent relative to a predetermined direction and a shaping die bend surface intersecting the shaping die reference surface along the predetermined direction. The laminated body is made of a plurality of laminated fiber sheets and includes: a laminated body reference surface curved or bent relative to the predetermined direction and configured to be overlapped on the shaping die reference surface; and a laminated body bend surface intersecting the laminated body reference surface along the predetermined direction and configured to be overlapped on the shaping die bend surface, an angle between the laminated body reference surface and the laminated body bend surface is larger than an angle between the shaping die reference surface and the shaping die bend surface, and when a ridge where the shaping die reference surface and the shaping die bend surface intersect with each other is defined as a shaping die edge, and a ridge where the laminated body reference surface and the laminated body bend surface intersect with each other is defined as a laminated body edge, the laminated body edge is displaced from the shaping die edge on the shaping die reference surface in a state where the laminated body reference surface is overlapped on the shaping die reference surface.

Further, the forming method according to one aspect of the present disclosure is a forming method of overlapping and forming a laminated body made of a plurality of laminated fiber sheets on a shaping die, the shaping die has a shaping die reference surface curved or bent relative to a predetermined direction and a shaping die bend surface intersecting the shaping die reference surface along the predetermined direction, the laminated body has a laminated body reference surface curved or bent relative to the predetermined direction and a laminated body bend surface intersecting the laminated body reference surface along the predetermined direction, and an angle between the laminated body reference surface and the laminated body bend surface is larger than an angle between the shaping die reference surface and the shaping die bend surface. The forming method includes: overlapping the laminated body reference surface on the shaping die reference surface; and bending the laminated body bend surface toward the shaping die bend surface along a bending line extending in the predetermined direction, and when a ridge where the laminated body reference surface and the laminated body bend surface intersect with each other is defined as a laminated body edge, the bending line is displaced from the laminated body edge.

According to the present disclosure, it is possible to eliminate excess of a fiber sheet or insufficiency of a fiber sheet.

BRIEF DESCRIPTION OF THE SEVERAL VIEWS OF THE DRAWINGS

FIG. 12 is a perspective view illustrating a lamination die on which the laminated body is laminated, according to the first embodiment of the present disclosure.

FIG. 16 is a plan view illustrating a state where the laminated body is placed on the shaping die in the second embodiment of the present disclosure.

FIG. 20 is a perspective view illustrating a state where a laminated body is placed on the shaping die in a modified example of the second embodiment of the present disclosure.

FIG. 22 is a diagram illustrating another example of a sectional view taken along a Y-Z plane of the shaping die in the first embodiment and the second embodiment of the present disclosure.

DETAILED DESCRIPTION

Embodiments of the laminated body and the forming method according to the present disclosure will be described below with reference to the drawings.

First Embodiment

In the present embodiment, a composite material structure that is a molded article with the final shape is manufactured by overlapping and forming a laminated body 20 (charge) on a shaping die 10, the laminated body 20 being made of a plurality of laminated fiber sheets.

Figure 1:
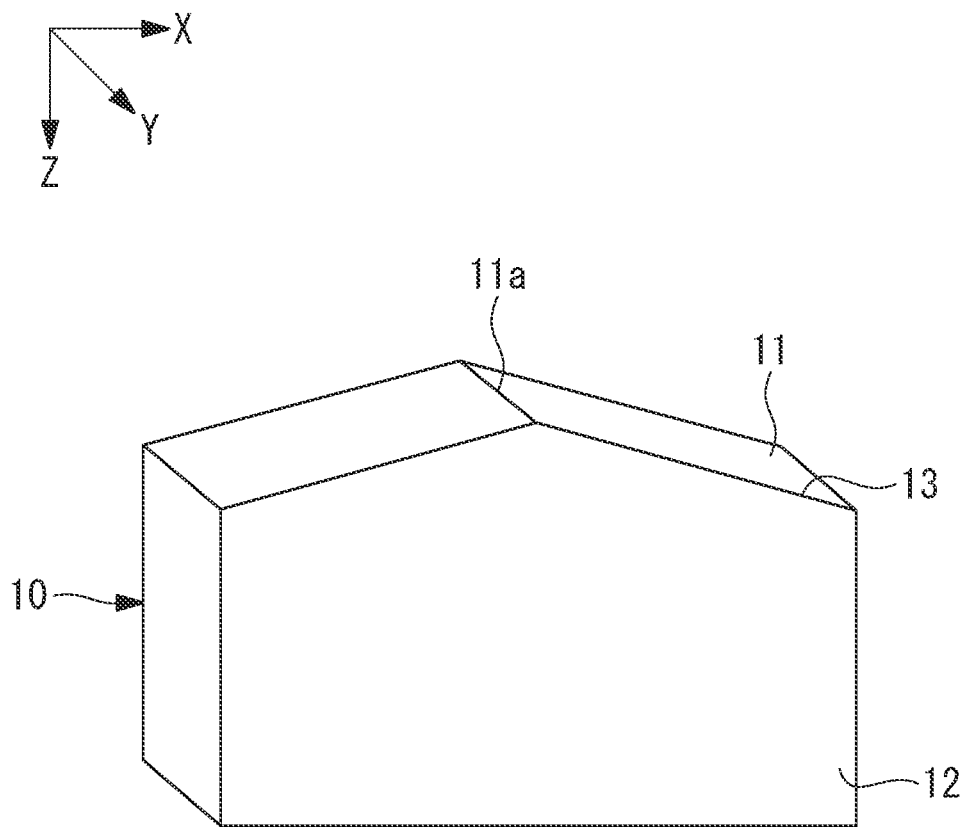
FIG. 1 is a perspective view illustrating a shaping die in a first embodiment of the present disclosure.

As illustrated in FIG. 1, the shaping die 10 is a block-like member having a shaping die reference surface 11 and a shaping die bend surface 12. By the laminated body 20 described later being overlapped on the shaping die 10, the laminated body 20 will be formed into a shape in accordance with the shape of the shaping die 10.

The shaping die reference surface 11 is a bent surface, which is the upper surface of the shaping die 10 in FIG. 1. A laminated body reference surface 21 of the laminated body 20 described later is overlapped on the shaping die reference surface 11.

The shaping die reference surface 11 is bent such that the height in the Z-axis direction changes in the X-axis direction. Specifically, when viewed from the front in the Y-axis direction, the shaping die reference surface 11 has a convex shape having the top at substantially the center (hereafter, referred to as a "shaping die top 11a"). The shaping die top 11a extends linearly in the Y-axis direction and defines a ridge of the shaping die reference surface 11.

The shaping die bend surface 12 is a surface connected to the shaping die reference surface 11, which is the front surface of the shaping die 10 in FIG. 1. A laminated body bend surface 22 of the laminated body 20 described later is bent and overlapped on the shaping die bend surface 12.

The shaping die bend surface 12 is connected to the edge of the shaping die reference surface 11 extending in the X-axis direction and intersects the shaping die reference surface 11 on this edge.

Note that the angle between the shaping die reference surface 11 and the shaping die bend surface 12 is 90 degrees in FIG. 1 when viewed from the side, namely, viewed from the X-axis direction, but the angle is not limited thereto. In this regard, however, the angle is smaller than the angle between the laminated body reference surface 21 and the laminated body bend surface 22 described later.

Herein, the ridge on which the shaping die reference surface 11 and the shaping die bend surface 12 intersect with each other is defined as a shaping die edge 13.

The shaping die edge 13 is bent such that the height in the Z-axis direction changes in the X-axis direction in the same manner as the shaping die reference surface 11. This is natural given that the shaping die edge 13 is also the edge of the shaping die reference surface 11.

Figure 2:
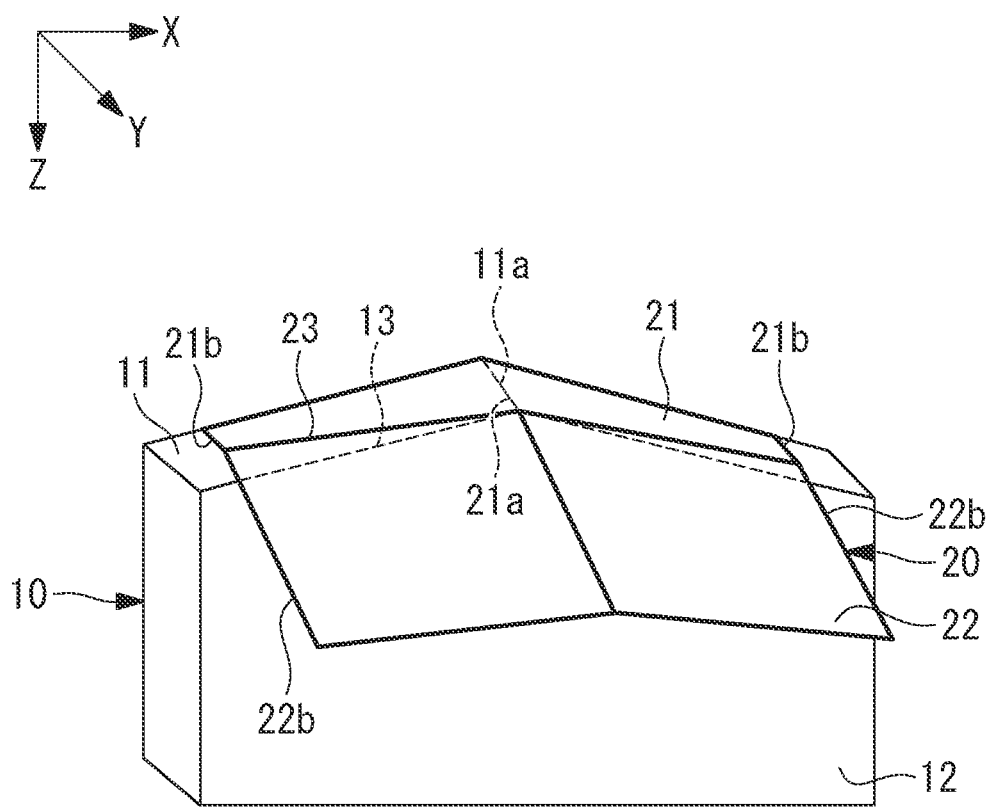
FIG. 2 is a perspective view illustrating a state where a laminated body is placed on the shaping die in the first embodiment of the present disclosure.

As illustrated in FIG. 2, the laminated body 20 is made up of a plurality of laminated fiber sheets.

The fiber sheet is made of a fiber base material whose fiber directions are matched to be parallel to the longitudinal direction of the fiber sheet and a resin impregnated into the fiber base material.

For the fiber base material, any fibers such as carbon fibers, glass fibers, or the like may be used.

For the resin impregnated into the fiber base material, a thermosetting resin cured when heated may be used. Examples thereof include an epoxy resin, polyimide, polyurethan, and unsaturated polyester.

Besides the above, a thermoplastic resin solidified through heating may also be used. Examples thereof include polyamide, polyethylene, polystyrene, and polyvinyl chloride.

Note that the fiber sheet is not limited to the fiber sheets described above. For example, the fiber sheet may be a formable dry sheet. Further, for example, the fiber direction may be a direction that is not parallel to the longitudinal direction of the sheet.

The laminated body 20 has the laminated body reference surface 21 and the laminated body bend surface 22.

The laminated body reference surface 21 is a bent surface. The laminated body reference surface 21 is overlapped on the shaping die reference surface 11 of the shaping die 10.

The laminated body reference surface 21 is bent such that the height in the Z-axis direction changes in the X-axis direction. Specifically, when viewed from the front in the Y-axis direction, the laminated body reference surface 21 has a convex shape having the top at substantially the center (hereafter, referred to as a "laminated body top 21a"). This convex shape corresponds to the convex shape of the shaping die reference surface 11. The laminated body top 21a extends linearly in the Y-axis direction and defines a ridge of the laminated body reference surface 21.

The laminated body bend surface 22 is a surface connected to the laminated body reference surface 21. The laminated body bend surface 22 is bent toward the shaping die bend surface 12 of the shaping die 10 and overlapped thereon.

The laminated body bend surface 22 is connected to the edge of the laminated body reference surface 21 extending in the X-axis direction and intersects the laminated body reference surface 21 on this edge.

Note that the angle between the laminated body reference surface 21 and the laminated body bend surface 22 is set to be larger than the angle between the shaping die reference surface 11 and the shaping die bend surface 12 when viewed from the side, namely, viewed from the X-axis direction. Thus, as with the state illustrated in FIG. 2, the laminated body bend surface 22 is separated from the shaping die bend surface 12 when the laminated body 20 is placed on the shaping die 10 such that the laminated body reference surface 21 is overlapped on the shaping die reference surface 11.

Herein, the ridge on which the laminated body reference surface 21 and the laminated body bend surface 22 intersect with each other is defined as a laminated body edge 23.

The laminated body edge 23 is bent such that the height in the Z-axis direction changes in the X-axis direction in the same manner as the laminated body reference surface 21. This is natural given that the laminated body edge 23 is also the edge of the laminated body reference surface 21.

The laminated body edge 23 is set so as to have the following positional relationship with respect to the shaping die edge 13 between the shaping die 10 and the laminated body 20 described above.

Figure 3:
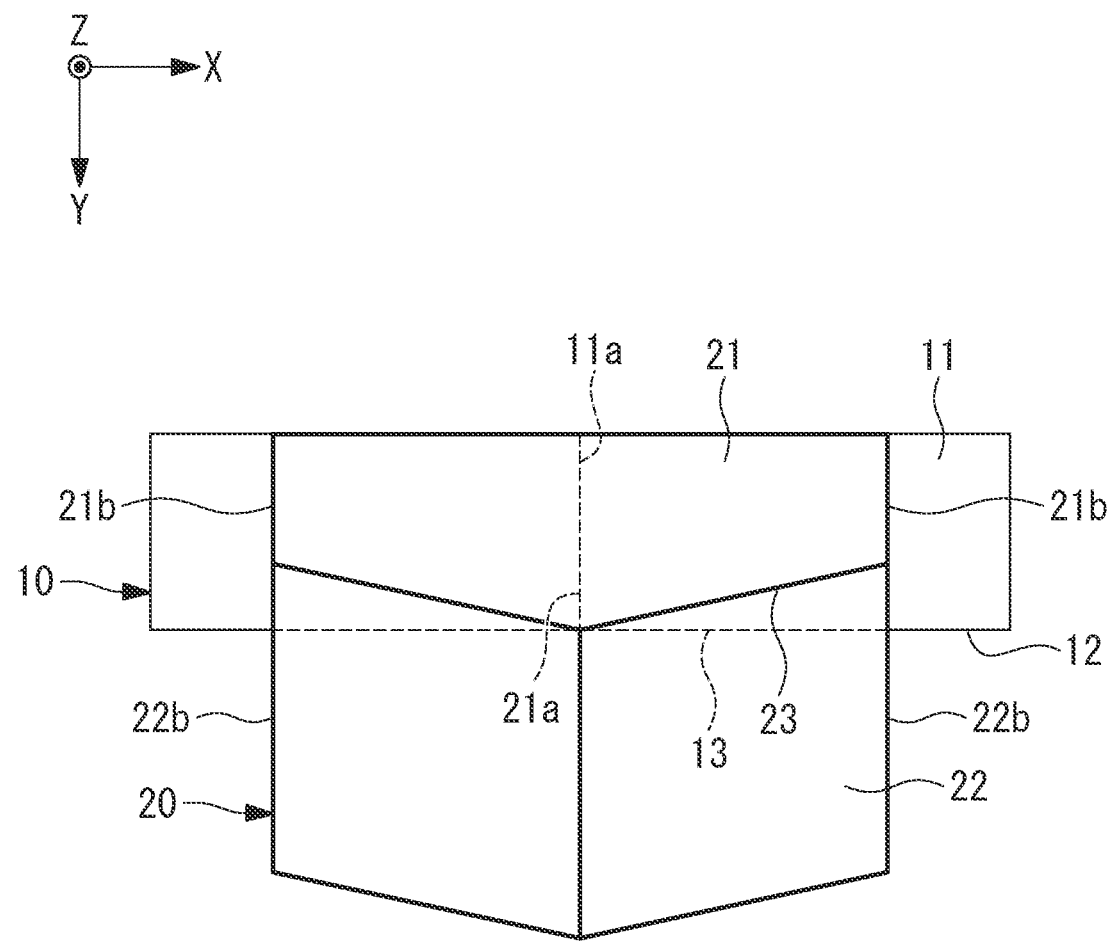
FIG. 3 is a plan view illustrating a state where the laminated body is placed on the shaping die in the first embodiment of the present disclosure.
Figure 4:
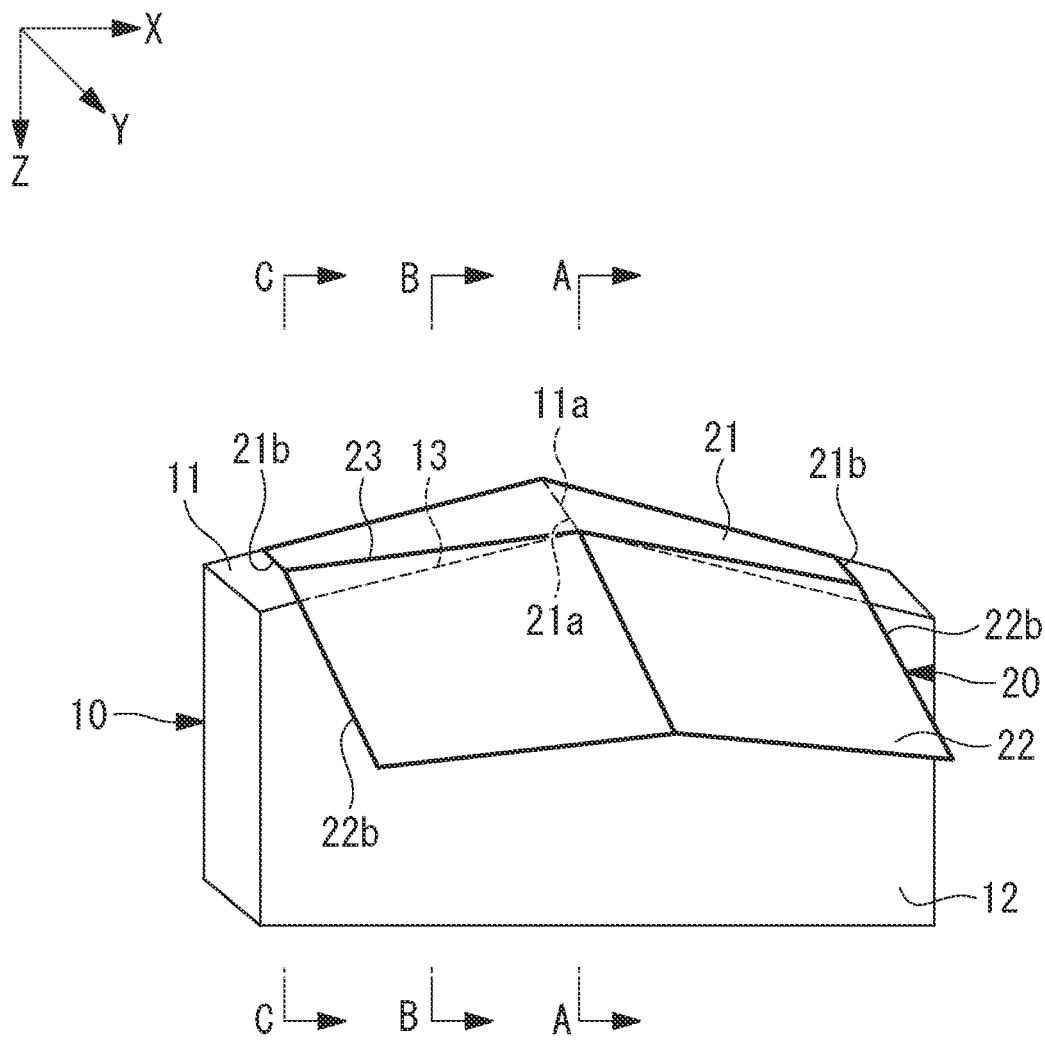
FIG. 4 is a perspective view illustrating a state where the laminated body is placed on the shaping die in the first embodiment of the present disclosure.

As illustrated in FIG. 3 and FIG. 4, the shaping die edge 13 runs straight in the X-axis direction.

On the other hand, the laminated body edge 23 is displaced from the shaping die edge 13 on the shaping die reference surface 11 in a state where the laminated body reference surface 21 is overlapped on the shaping die reference surface 11 so that the laminated body top 21a matches the shaping die top 11a.

In detail, the laminated body edge 23 matches the shaping die edge 13 at a portion (point) intersecting the laminated body top 21a and is displaced from the shaping die edge 13 in the remaining portion.

In more detail, the laminated body edge 23 is displaced from the shaping die edge 13 so as to be gradually spaced away from the shaping die edge 13 as a position on the laminated body edge 23 approaches a side end 21b from the laminated body top 21a. Accordingly, the amount of displacement of the laminated body edge 23 from the shaping die edge 13 increases as a position on the laminated body edge 23 approaches the side end 21b from the laminated body top 21a.

Thus, the laminated body edge 23 has substantially a V-shape in planar view from the Z-axis direction.

Figure 5:
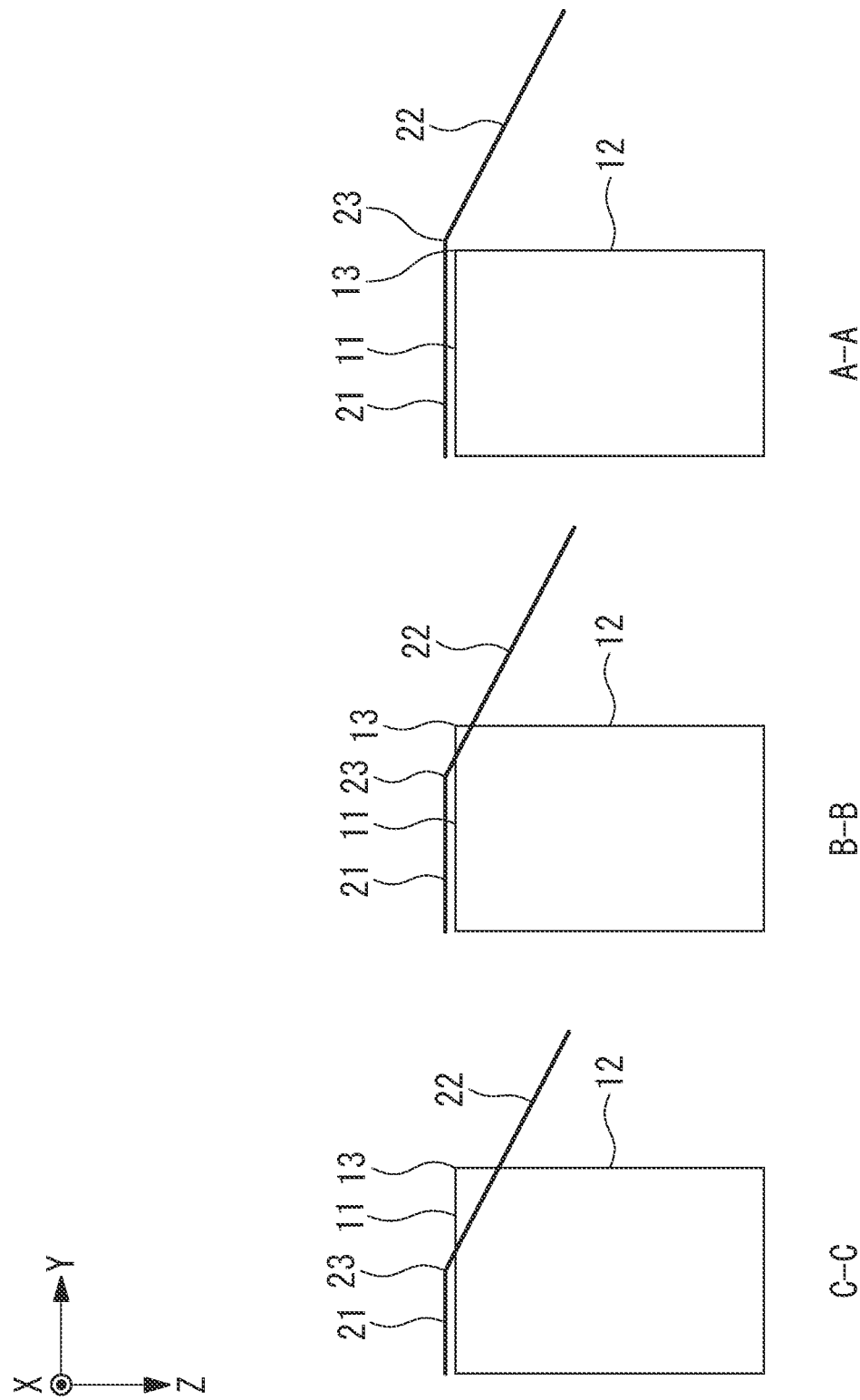
FIG. 5 represents sectional views taken along a cut line A-A, a cut line B-B, and a cut line C-C illustrated in FIG. 4.

FIG. 5 illustrates sectional views taken along the Y-Z plane at several positions in the X-axis direction in FIG. 4.

In these sectional views, the A-A cross section corresponds to a sectional view passing through the laminated body top 21a, the C-C cross section corresponds to a sectional view passing through the side end 21b, and the B-B cross section corresponds to a sectional view between the A-A cross section and the C-C cross section.

In accordance with these views, the laminated body edge 23 is displaced from the shaping die edge 13 so as to be gradually spaced away from the shaping die edge 13 as a position on the laminated body edge 23 approaches the side end 21b from the laminated body top 21a. Thus, a position on the laminated body edge 23 is gradually spaced away from the shaping die edge 13 as the position approaches the C-C cross section from the A-A cross section.

The laminated body edge 23 set as described above works as follows.

First, as illustrated in FIG. 2, the laminated body 20 is placed on the shaping die 10 so that the laminated body reference surface 21 overlaps the shaping die reference surface 11.

Figure 6:
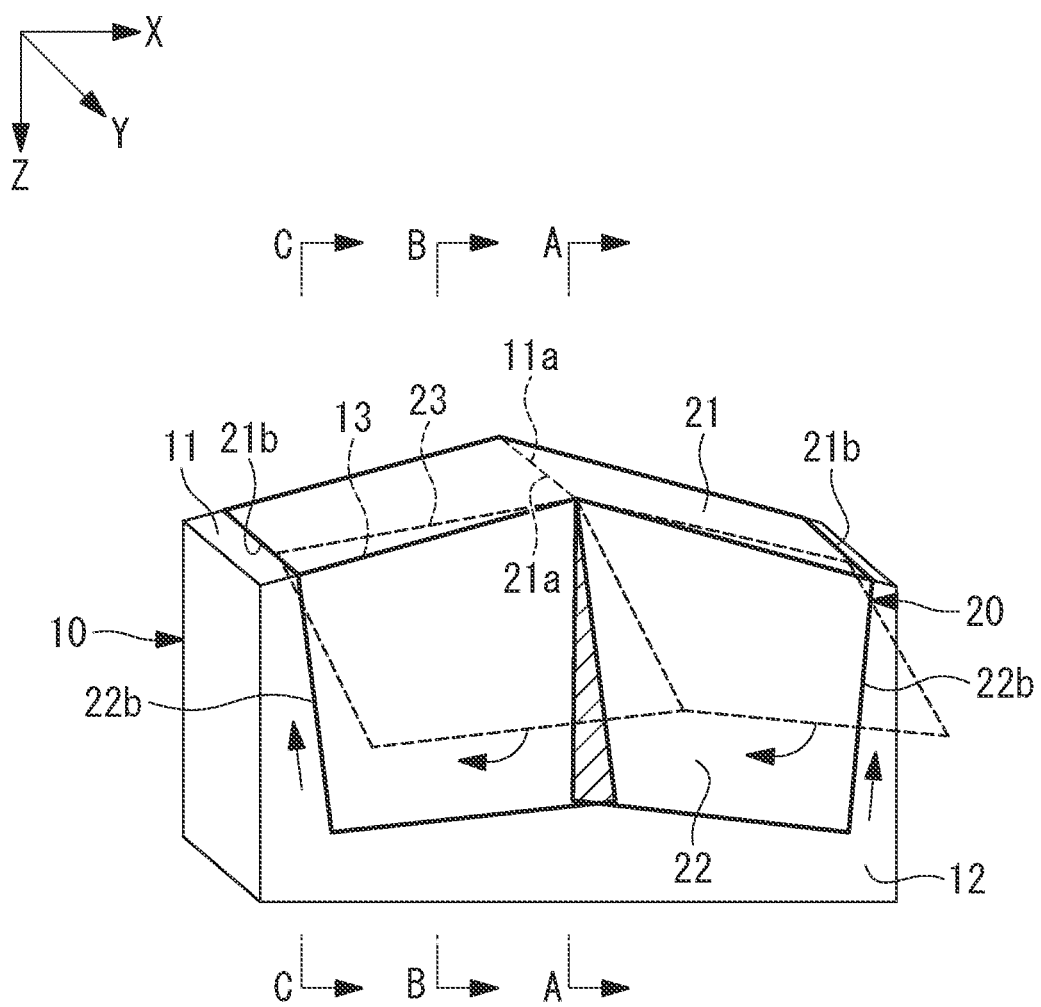
FIG. 6 is a perspective view illustrating a state where the laminated body is overlapped on the shaping die in the first embodiment of the present disclosure.

Next, as illustrated in FIG. 6, the laminated body bend surface 22 is bent toward the shaping die bend surface 12 so that the laminated body bend surface 22 overlaps the shaping die bend surface 12.

Figure 7:
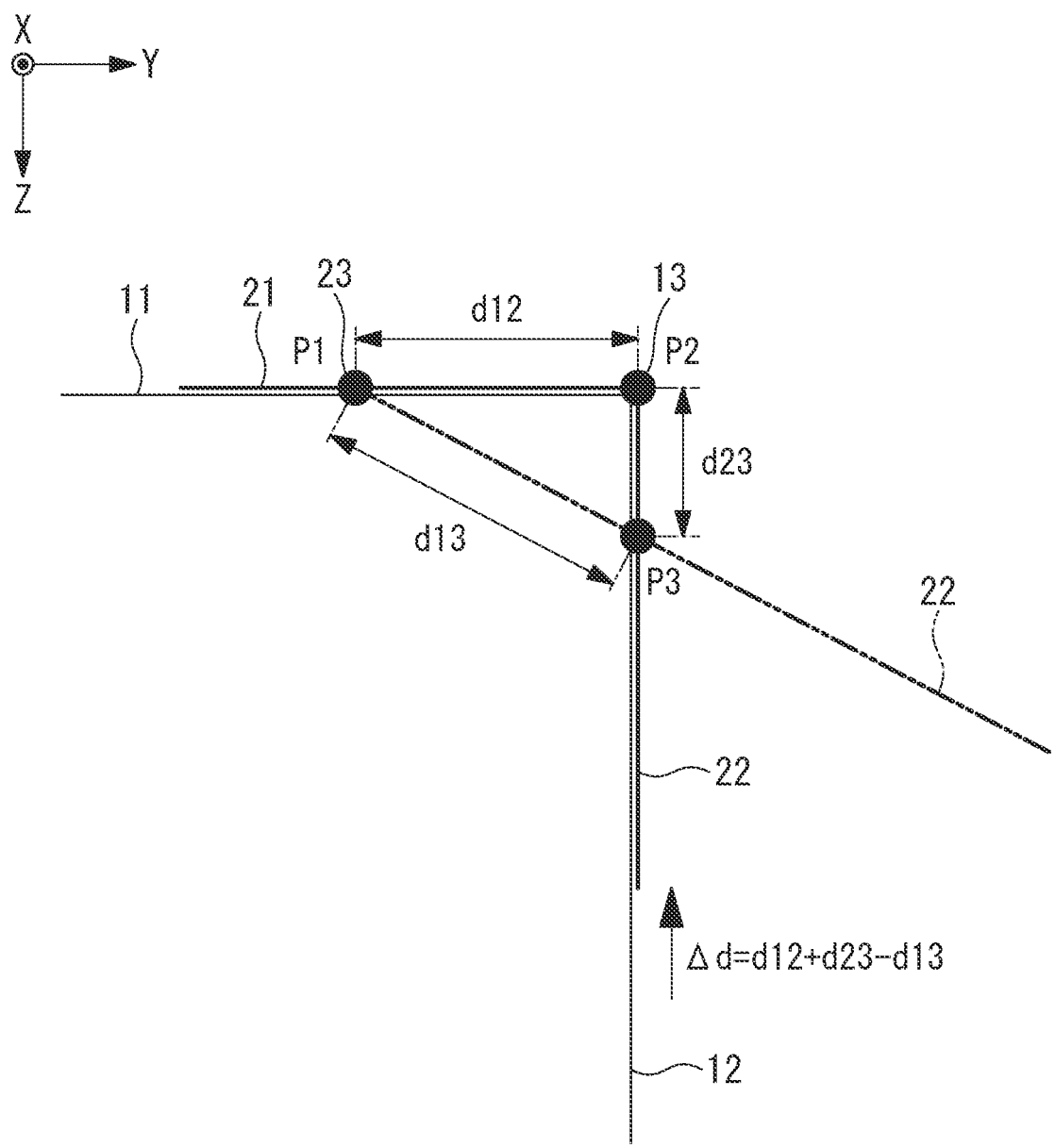
FIG. 7 is a sectional view of a particular position on an X-axis direction in the first embodiment of the present disclosure.

In this state, as illustrated in FIG. 7, the laminated body bend surface 22 moves and is overlapped on the shaping die bend surface 12 as follows at any position moved from the laminated body top 21a in the X-axis direction.

In a state before bent (represented by a dashed line), the laminated body bend surface 22 slopes downward starting from the point P1, which corresponds to the laminated body edge 23, and shortcuts a corner of the shaping die 10 including the point P2, which corresponds to the shaping die edge 13. Herein, a virtual intersection between the laminated body bend surface 22 before bent and the shaping die bend surface 12 is denoted as a point P3.

In a physical sense, however, the laminated body bend surface 22 does not actually shortcut the corner of the shaping die 10. Thus, in reality, the laminated body bend surface 22 is overlapped on the shaping die bend surface 12 so as to pass through the point P2 and be bent at the point P2. Accordingly, the actual bending line is not along the laminated body edge 23 but along the shaping die edge 13.

In this state, the laminated body bend surface 22 is overlapped on the shaping die bend surface 12 so as to take the long way around to pass through the point P2. Thus, the lower end of the laminated body bend surface 22 is pulled up toward the point P2 side for the distance corresponding to the taken long way.

In this state, the dimension Δd in which the laminated body bend surface 22 is pulled up is d12+d23−d13, where d12 is the distance between the point P1 and point P2, d23 is the distance between the point P2 and the point P3, and d13 is the distance between the point P1 and the point P3.

Figure 8:
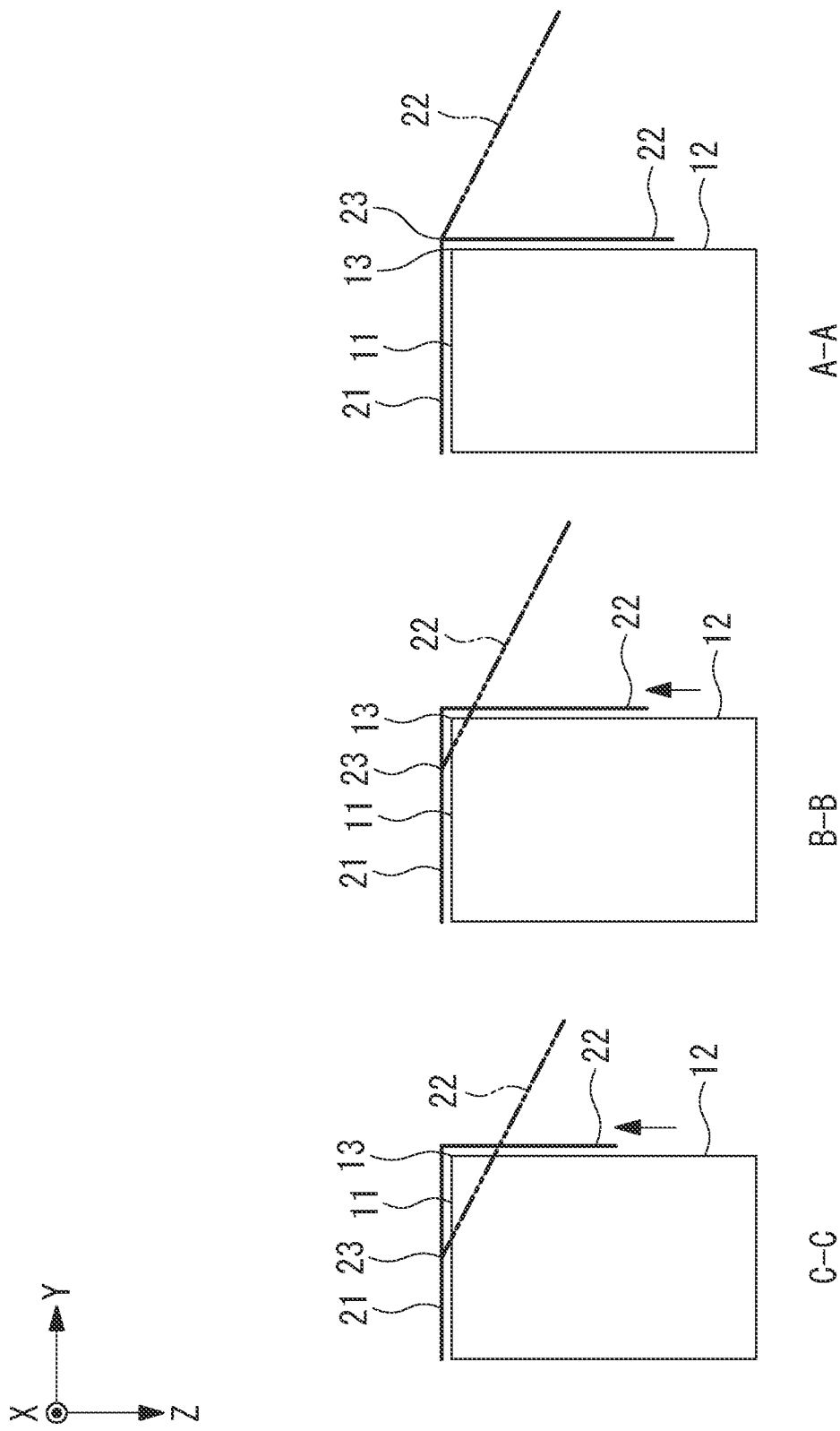
FIG. 8 represents sectional views taken along a cut line A-A, a cut line B-B, and a cut line C-C illustrated in FIG. 6.

As described previously, as illustrated in FIG. 5, the laminated body edge 23 is displaced from the shaping die edge 13 so as to be gradually spaced away from the shaping die edge 13 as a position on the laminated body edge 23 approaches the side end 21b from the laminated body top 21a. Thus, as illustrated in FIG. 8, a region of the laminated body bend surface 22 which is closer to a side end 22b has a larger amount of the shortcut of the corner of the shaping die 10. In other words, a region of the laminated body bend surface 22 which is closer to the side end 22b has a larger dimension Δd in which the laminated body bend surface 22 is pulled up.

This means that, as illustrated in FIG. 6, the laminated body bend surface 22 overlapped on the shaping die bend surface 12 spreads to both sides (both the side end 22b sides) in the lateral direction when viewed from the front in the Y-axis direction. Thus, excess of the fiber sheet of the laminated body bend surface 22 at the center (excessive overlapping of the laminated body 20) is cancelled.

Herein, d12 in FIG. 7, that is, the distance along the shaping die reference surface 11 between the laminated body edge 23 and the shaping die edge 13 is determined as follows, for example.

Figure 9:
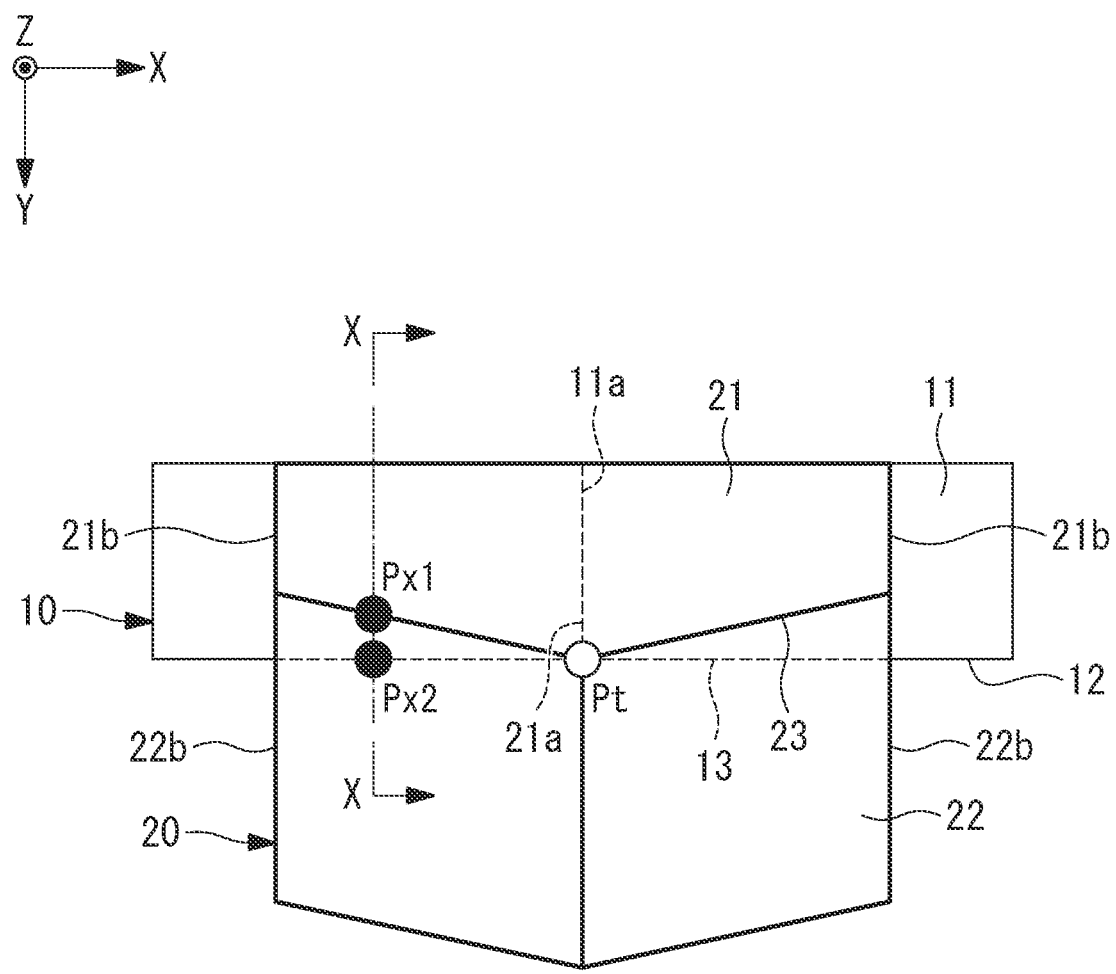
FIG. 9 is a plan view illustrating a relationship between a point Px1, a point Px2, and a point Pt in the first embodiment of the present disclosure.
Figure 10:
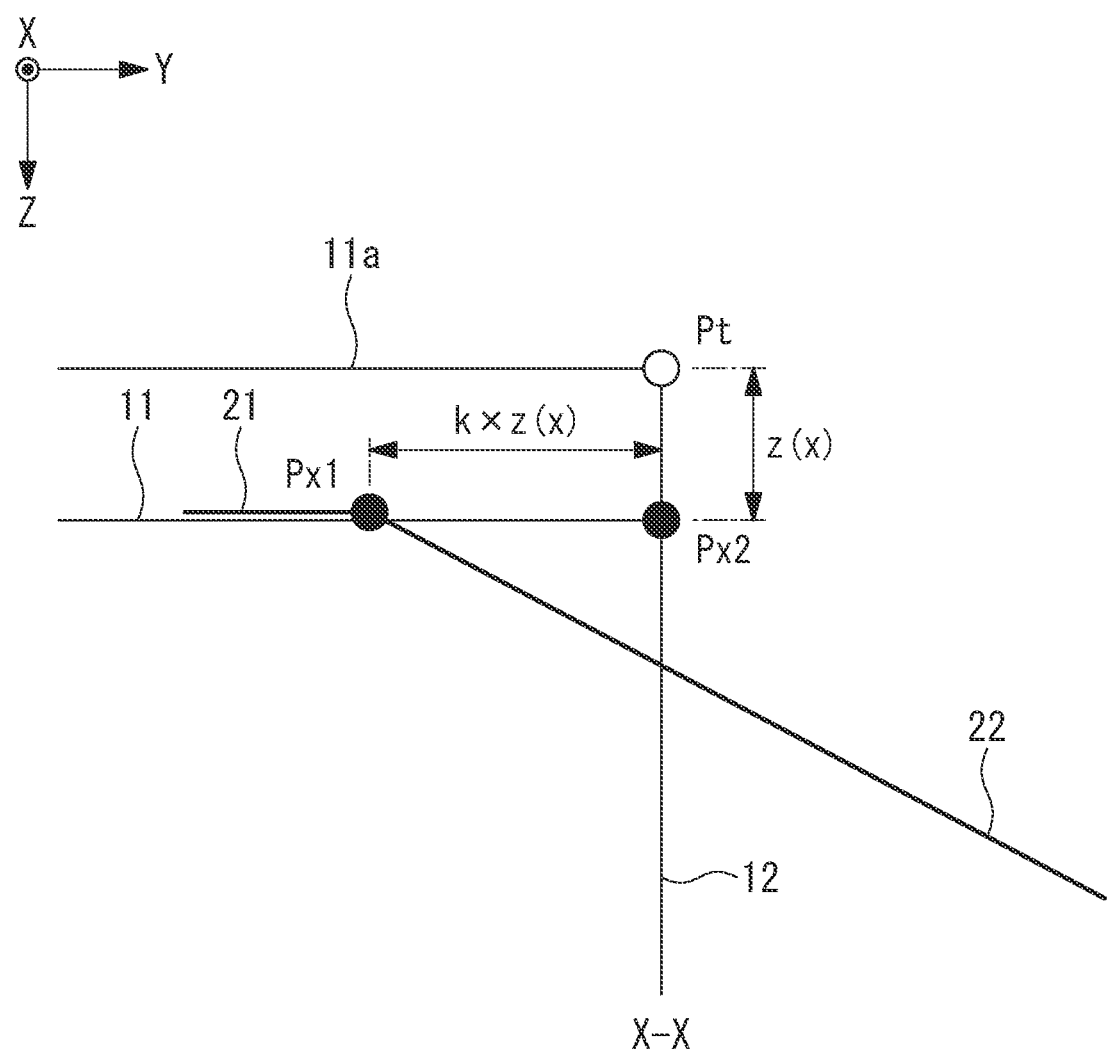
FIG. 10 is a sectional view illustrating the relationship between the point Px1, the point Px2, and the point Pt in the first embodiment of the present disclosure.

As illustrated in FIG. 9 and FIG. 10, in an X-X cross section on the Y-Z plane at any position x, a point corresponding to the laminated body edge 23 is denoted as a point Px1, and a point corresponding to the shaping die edge 13 is denoted as a point Px2. Thus, the intersection between this Y-Z plane and the laminated body edge 23 is the point Px1, and the intersection between this Y-Z plane and the shaping die edge 13 is the point Px2.

Further, in a cross section on the Y-Z plane passing through the shaping die top 11a of the shaping die reference surface 11, a point corresponding to the shaping die edge 13 is denoted as a point Pt. Thus, the intersection between this Y-Z plane and the shaping die edge 13 is the point Pt.

Further, the distance between the point Pt and the point Px2 when viewed from the side in the X-axis direction, that is, the distance between the point Pt and the point Px2 in the Z-axis direction is denoted as z(x).

Then, the distance between the point Px1 and the point Px2 is determined as k×z(x). Herein, k is a predetermined constant of proportionality.

The constant of proportionality k is described below.

Figure 11:
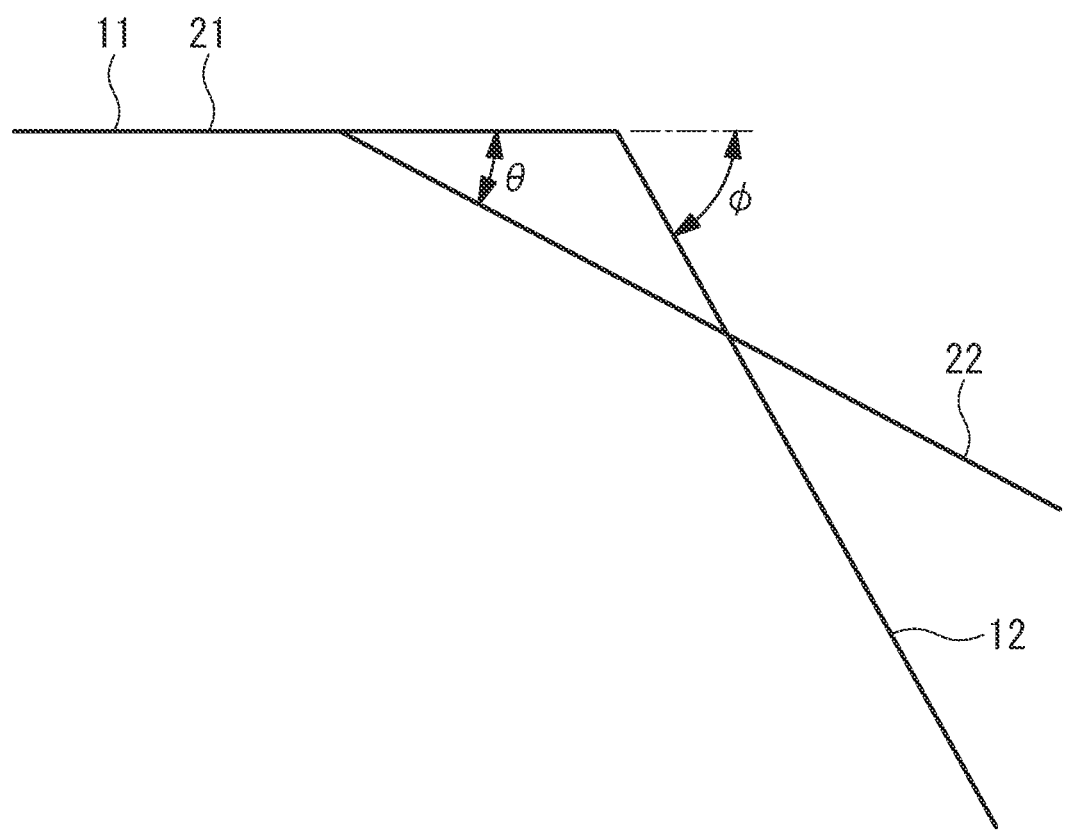
FIG. 11 is another example of a sectional view of a particular position on the X-axis direction in the first embodiment of the present disclosure.

As illustrated in FIG. 11, the constant of proportionality k is expressed by the following equation (Equation 1), where θ is the angle between the shaping die reference surface 11 and the outer surface of the laminated body bend surface 22, and φ is the angle between the extension line of the shaping die reference surface 11 and the shaping die bend surface 12.

$$k = \left\{ 1 - \frac{\cos\theta(\sin\varphi - \sin\theta)}{\sin\varphi - \sin\theta\cos(\varphi - \theta)} \right\}^{-1} \quad [\text{Math. 1}]$$

Note that an arbitrary φ is used for generalization in FIG. 11, but FIG. 10 represents a case where φ is 90 degrees (½π[rad]), for example.

The laminated body 20 is manufactured by laminating fiber sheets on a lamination die 30 as illustrated in FIG. 12. A lamination surface 31 corresponding to the upper surface of the lamination die 30 corresponds to the shape of the laminated body reference surface 21 and the laminated body bend surface 22 of the laminated body 20.

The lamination of the fiber sheet on the lamination die 30 may be manually performed by an operator or may be automatically performed by a robot.

Modified Example

Figure 13:
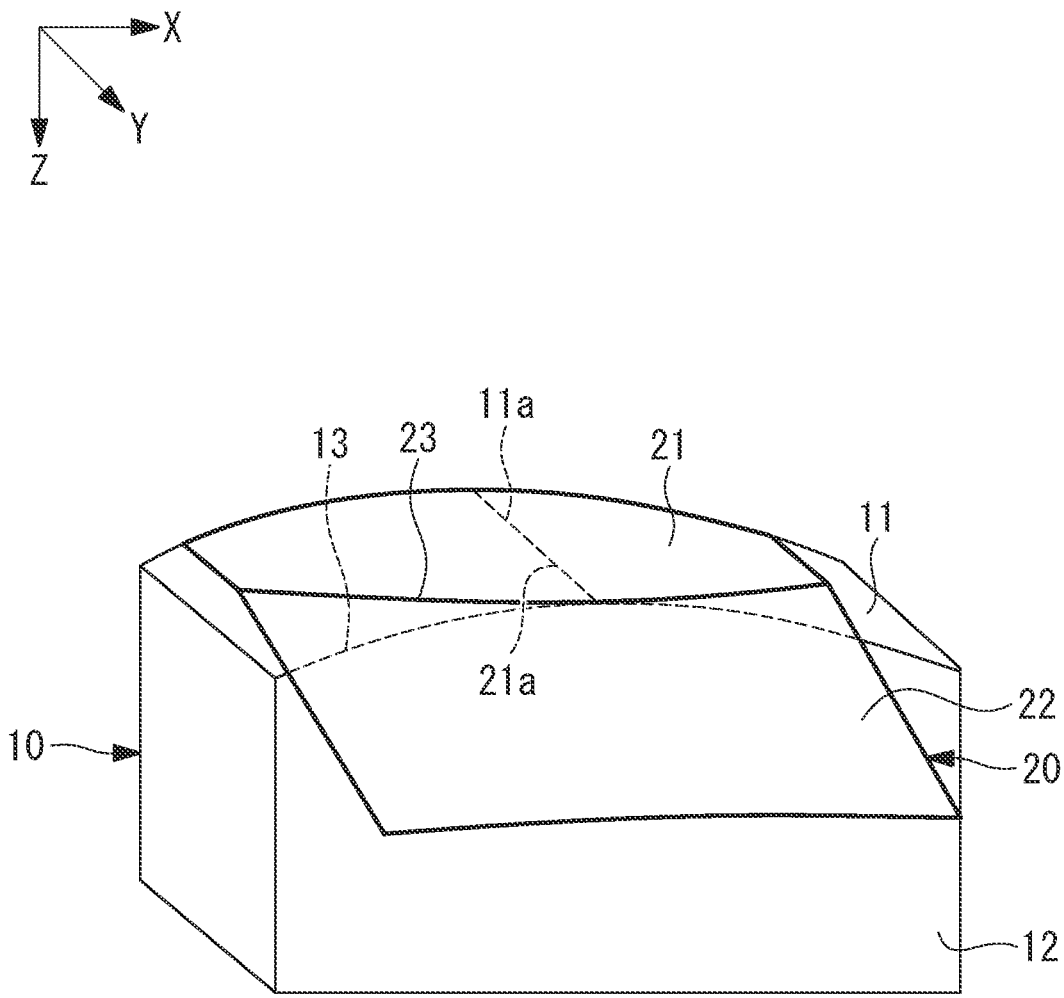
FIG. 13 is a perspective view illustrating a state where a laminated body is placed on the shaping die in a modified example of the first embodiment of the present disclosure.

As illustrated in FIG. 13, the shaping die reference surface 11 may be a curved surface.

The shaping die reference surface 11 is smoothly curved so that the height in the Z-axis direction changes in the X-axis direction. Specifically, the shaping die reference surface 11 has a smooth convex shape having the shaping die top 11a at substantially the center when viewed from the front in the Y-axis direction.

Further, the laminated body reference surface 21 may be a curved surface.

The laminated body reference surface 21 is smoothly curved so that the height in the Z-axis direction changes in the X-axis direction. Specifically, the laminated body reference surface 21 has a smooth convex shape having the laminated body top 21a at substantially the center when viewed from the front in the Y-axis direction. This convex shape corresponds to the convex shape of the shaping die reference surface 11.

In the present embodiment, the following advantageous effects are achieved.

The amount of displacement of the laminated body edge 23 from the shaping die edge 13 increases as a position on the laminated body edge 23 approaches the side end 21b from the laminated body top 21a in the convex shape. Thus, when the laminated body bend surface 22 is overlapped on the shaping die bend surface 12, portions closer to both the side ends 22b of the laminated body bend surface 22 are pulled up to the shaping die edge 13 side, and portions closer to the laminated body top 21a are not pulled up to the shaping die edge 13 side. Thus, excess of the fiber sheet occurring on the laminated body bend surface 22 when the laminated body bend surface 22 is overlapped on the shaping die bend surface 12 can be cancelled by the displacement between the shaping die edge 13 and the laminated body edge 23.

Figure 14:
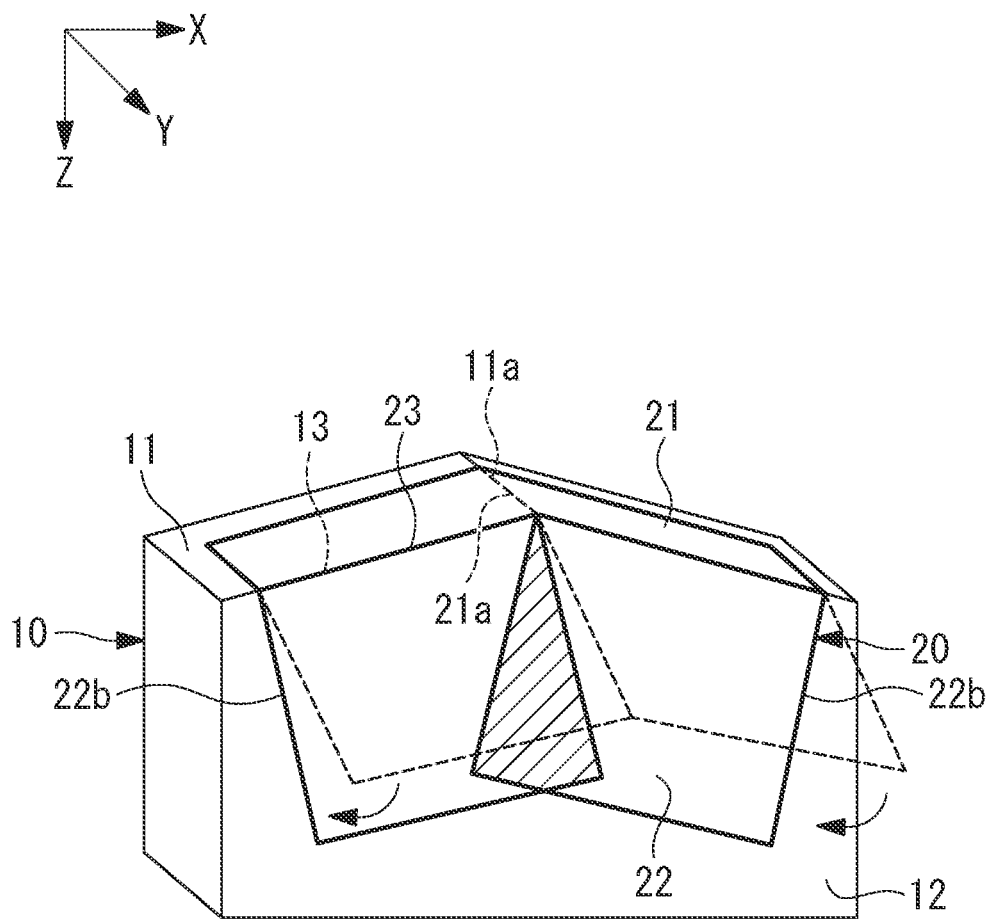
FIG. 14 is a perspective view illustrating a state where a laminated body is placed on the shaping die in a comparative example to the first embodiment of the present disclosure.

As illustrated in FIG. 14, if the shaping die edge 13 and the laminated body edge 23 match, the fiber sheet will be excessive in the laminated body bend surface 22 compared to the case of the above embodiment when the laminated body bend surface 22 is overlapped on the shaping die bend surface 12. This is because that portions on both the side end 22b sides of the laminated body bend surface 22 are not pulled up to the shaping die edge 13 side.

Further, the distance between the shaping die edge 13 and the laminated body edge 23 at the position x is defined as k×z(x), and it is thus possible to set the distance between the shaping die edge 13 and the laminated body edge 23 based on the distance z(x).

Second Embodiment

Figure 15:
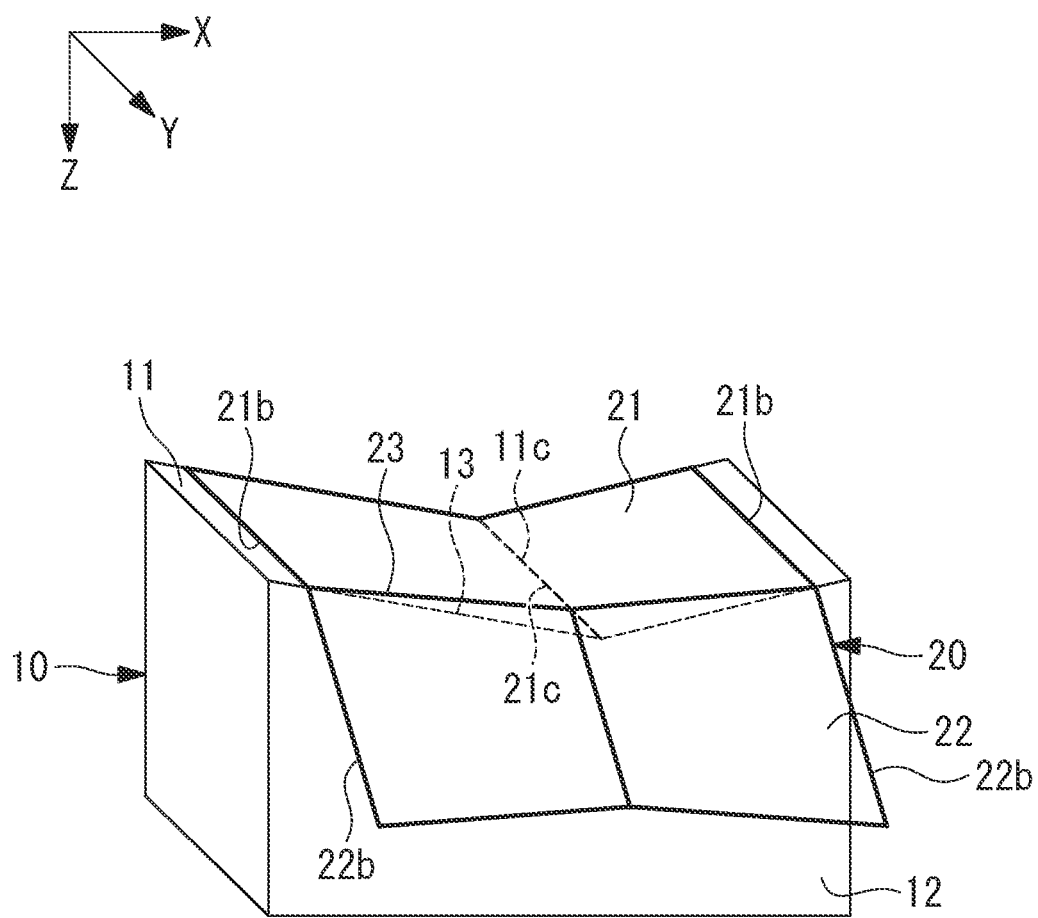
FIG. 15 is a perspective view illustrating a state where a laminated body is placed on a shaping die in a second embodiment of the present disclosure.

As illustrated in FIG. 15, the shaping die 10 is a block-like member having the shaping die reference surface 11 and the shaping die bend surface 12. By the laminated body 20 described later being overlapped on the shaping die 10, the laminated body 20 will be formed into a shape in accordance with the shape of the shaping die 10.

The shaping die reference surface 11 is a bent surface, which is the upper surface of the shaping die 10 in FIG. 14. The laminated body reference surface 21 of the laminated body 20 described later is overlapped on the shaping die reference surface 11.

The shaping die reference surface 11 is bent such that the height in the Z-axis direction changes in the X-axis direction. Specifically, when viewed from the front in the Y-axis direction, the shaping die reference surface 11 has a concave shape having the bottom at substantially the center (hereafter, referred to as a "shaping die bottom 11c"). The shaping die bottom 11c extends linearly in the Y-axis direction.

The shaping die bend surface 12 is a surface connected to the shaping die reference surface 11, which is the front surface of the shaping die 10 in FIG. 15. The laminated body bend surface 22 of the laminated body 20 described later is bent and overlapped on the shaping die bend surface 12.

The shaping die bend surface 12 is connected to the edge of the shaping die reference surface 11 extending in the X-axis direction and intersects the shaping die reference surface 11 on this edge.

Note that the angle between the shaping die reference surface 11 and the shaping die bend surface 12 is 90 degrees in FIG. 15 when viewed from the side, namely, viewed from the X-axis direction, but the angle is not limited thereto. In this regard, however, the angle is smaller than the angle between the laminated body reference surface 21 and the laminated body bend surface 22 described later.

Herein, the ridge on which the shaping die reference surface 11 and the shaping die bend surface 12 intersect with each other is defined as the shaping die edge 13.

The shaping die edge 13 is bent such that the height in the Z-axis direction changes in the X-axis direction in the same manner as the shaping die reference surface 11. This is natural given that the shaping die edge 13 is also the edge of the shaping die reference surface 11.

The laminated body 20 has the laminated body reference surface 21 and the laminated body bend surface 22.

The laminated body reference surface 21 is a bent surface. The laminated body reference surface 21 is overlapped on the shaping die reference surface 11 of the shaping die 10.

The laminated body reference surface 21 is bent such that the height in the Z-axis direction changes in the X-axis direction. Specifically, when viewed from the front in the Y-axis direction, the laminated body reference surface 21 has a concave shape having the bottom at substantially the center (hereafter, referred to as a "laminated body bottom 21c"). This concave shape corresponds to the concave shape of the shaping die reference surface 11. The laminated body bottom 21c extends linearly in the Y-axis direction.

The laminated body bend surface 22 is a surface connected to the laminated body reference surface 21. The laminated body bend surface 22 is bent toward the shaping die bend surface 12 of the shaping die 10 and overlapped thereon.

The laminated body bend surface 22 is connected to the edge of the laminated body reference surface 21 extending in the X-axis direction and intersects the laminated body reference surface 21 on this edge.

Note that the angle between the laminated body reference surface 21 and the laminated body bend surface 22 is set to be larger than the angle between the shaping die reference surface 11 and the shaping die bend surface 12 when viewed from the side, namely, viewed from the X-axis direction. Thus, as with the state illustrated in FIG. 15, the laminated body bend surface 22 is separated from the shaping die bend surface 12 when the laminated body 20 is placed on the shaping die 10 such that the laminated body reference surface 21 is overlapped on the shaping die reference surface 11.

Herein, the ridge on which the laminated body reference surface 21 and the laminated body bend surface 22 intersect with each other is defined as the laminated body edge 23.

The laminated body edge 23 is bent such that the height in the Z-axis direction changes in the X-axis direction in the same manner as the laminated body reference surface 21. This is natural given that the laminated body edge 23 is also the edge of the laminated body reference surface 21.

The laminated body edge 23 is set so as to have the following positional relationship with respect to the shaping die edge 13 between the shaping die 10 and the laminated body 20 described above.

Figure 17:
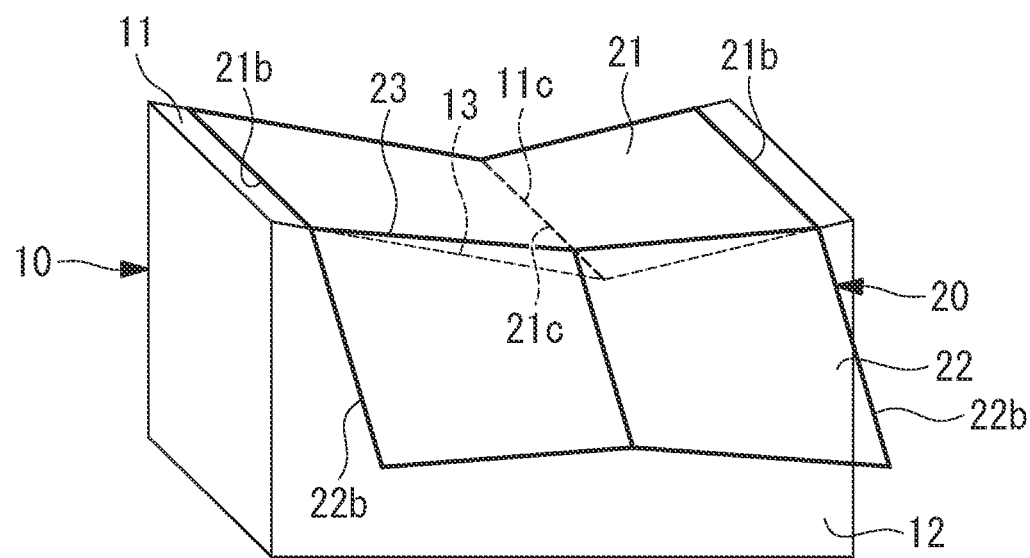
FIG. 17 is a perspective view illustrating a state where the laminated body is placed on the shaping die in the second embodiment of the present disclosure.

As illustrated in FIG. 16 and FIG. 17, the shaping die edge 13 runs straight in the X-axis direction.

On the other hand, the laminated body edge 23 is displaced from the shaping die edge 13 on the shaping die reference surface 11 in a state where the laminated body reference surface 21 is overlapped on the shaping die reference surface 11 so that the laminated body bottom 21c matches the shaping die bottom 11c.

In detail, the laminated body edge 23 matches the shaping die edge 13 at a portion (point) on the laminated body reference surface 21 intersecting the side end 21b and is displaced from the shaping die edge 13 in the remaining portion.

In more detail, the laminated body edge 23 is displaced from the shaping die edge 13 so as to be gradually spaced away from the shaping die edge 13 as a position on the laminated body edge 23 approaches the laminated body bottom 21c from the side end 21b. Accordingly, the amount of displacement of the laminated body edge 23 from the shaping die edge 13 increases as a position on the laminated body edge 23 approaches the laminated body bottom 21c from the side end 21b.

Thus, the laminated body edge 23 has substantially an inverse V-shape in planar view from the Z-axis direction.

Figure 18:
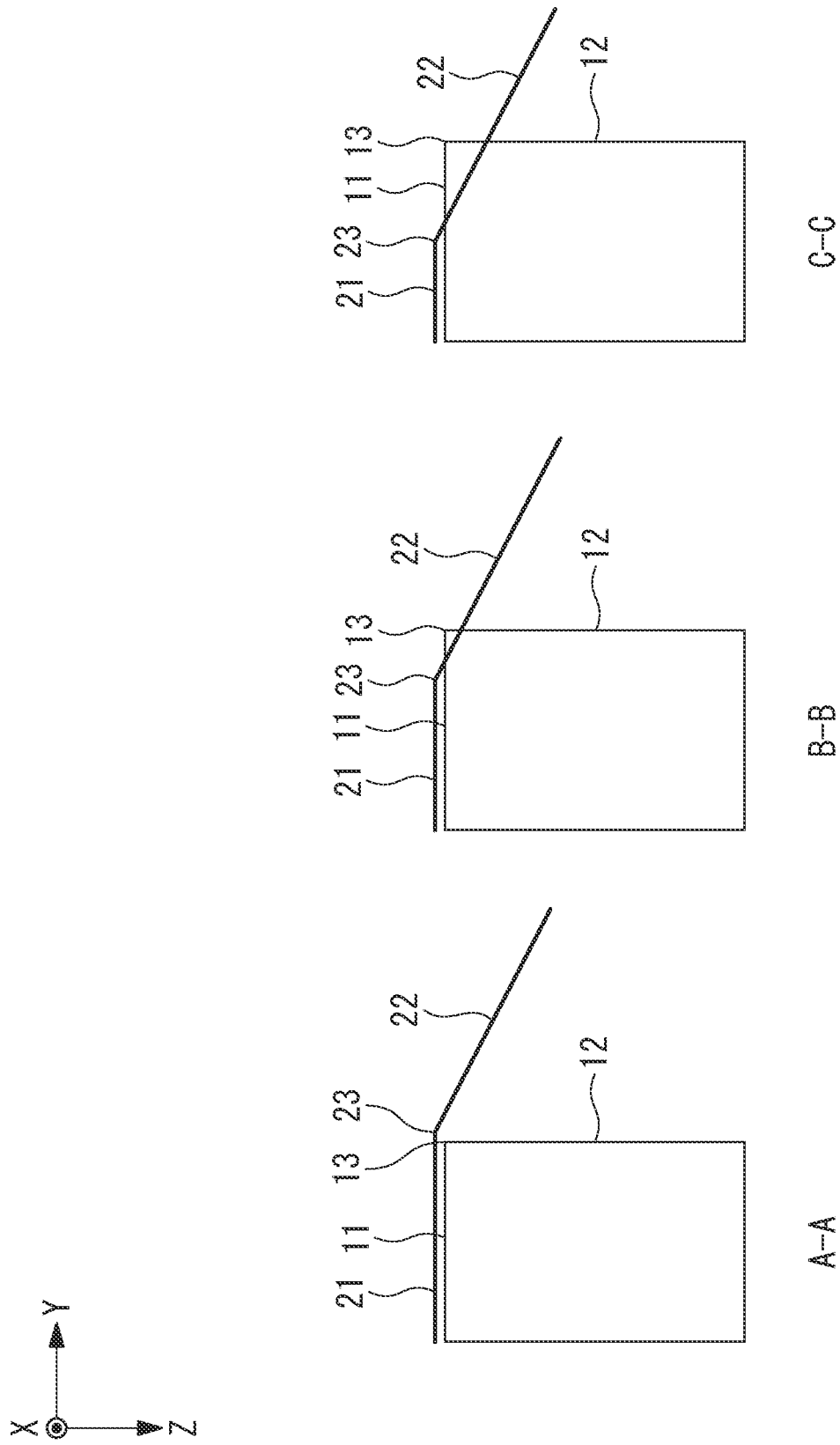
FIG. 18 represents sectional views taken along a cut line A-A, a cut line B-B, and a cut line C-C illustrated in FIG. 17.

FIG. 18 illustrates sectional views taken along the Y-Z plane at several positions in the X-axis direction in FIG. 17. In these sectional views, the A-A cross section corresponds to a sectional view passing through the laminated body bottom 21c, the C-C cross section corresponds to a sectional view passing through the side end 21b, and the B-B cross section corresponds to a sectional view between the A-A cross section and the C-C cross section.

In accordance with these views, the laminated body edge 23 is displaced from the shaping die edge 13 so as to be gradually spaced away from the shaping die edge 13 as a position on the laminated body edge 23 approaches the laminated body bottom 21c from the side end 21b. Thus, a position on the laminated body edge 23 is gradually spaced away from the shaping die edge 13 as the position approaches the C-C cross section from the A-A cross section.

The laminated body edge 23 set as described above works as follows. Note that the basic principle is the same as that in the first embodiment.

First, as illustrated in FIG. 15, the laminated body 20 is placed on the shaping die 10 so that the laminated body reference surface 21 overlaps the shaping die reference surface 11.

Figure 19:
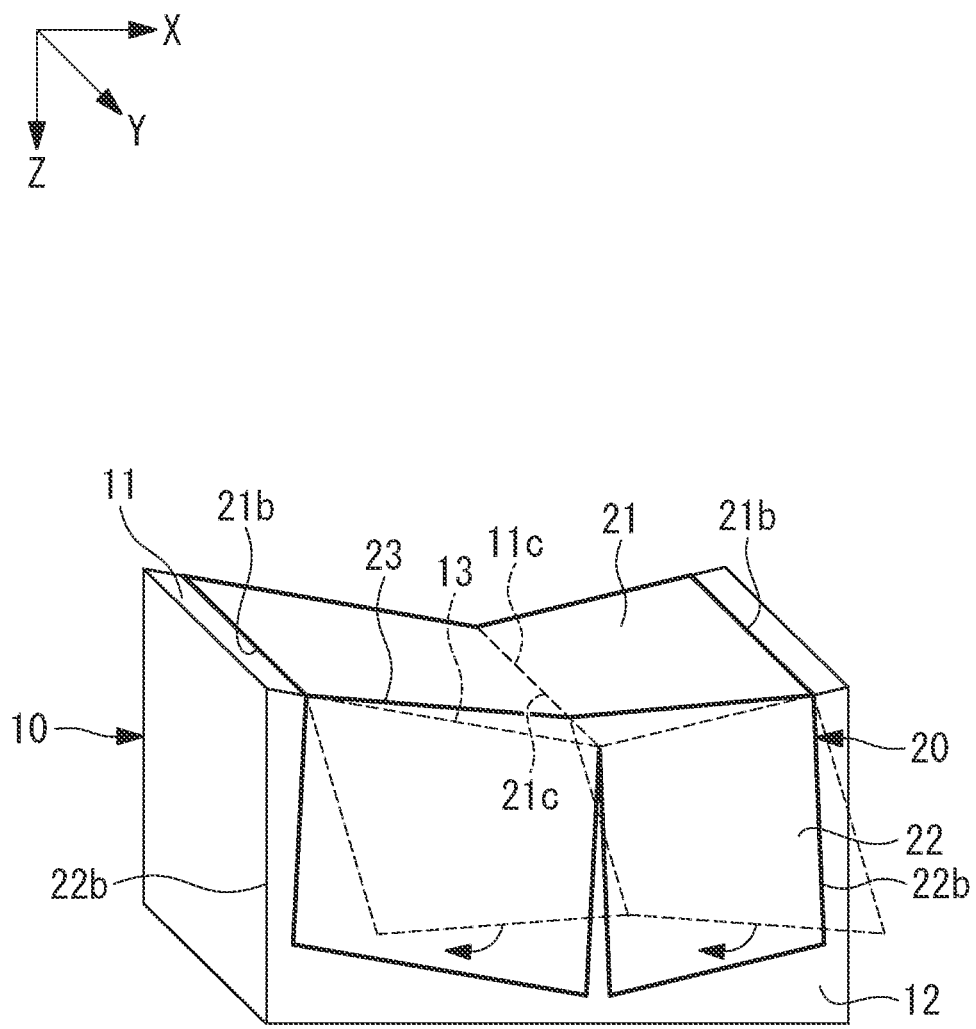
FIG. 19 is a perspective view illustrating a state where the laminated body is overlapped on the shaping die in the second embodiment of the present disclosure.

Next, as illustrated in FIG. 19, the laminated body bend surface 22 is bent toward the shaping die bend surface 12 so that the laminated body bend surface 22 overlaps the shaping die bend surface 12.

As described previously, as illustrated in FIG. 17, the laminated body edge 23 is displaced from the shaping die edge 13 so as to be gradually spaced away from the shaping die edge 13 as a position on the laminated body edge 23 approaches the laminated body bottom 21c from the side end 21b. Thus, a region of the laminated body bend surface 22 located on the center side has a larger amount of the shortcut of the corner of the shaping die 10. In other words, a region of the laminated body bend surface 22 located on the center side has a larger dimension $\Delta d$ in which the laminated body bend surface 22 is pulled up.

This means that the laminated body bend surface 22 overlapped on the shaping die bend surface 12 comes to the center side when viewed from the front in the Y-axis direction. Thus, insufficiency of the fiber sheet of the laminated body bend surface 22 at the center is compensated.

Note that z(x) in the present embodiment has a reference at the point Pt corresponding to the shaping die edge 13 in a cross section on the Y-Z plane passing through the side end 21b of the laminated body 20. Thus, the intersection between this Y-Z plane and the shaping die edge 13 is defined as the point Pt.

Modified Example

As illustrated in FIG. 20, the shaping die reference surface 11 may be a curved surface.

The shaping die reference surface 11 is smoothly curved so that the height in the Z-axis direction changes in the X-axis direction. Specifically, the shaping die reference surface 11 has a smooth concave shape having the shaping die bottom 11c at substantially the center when viewed from the front in the Y-axis direction.

Further, the laminated body reference surface 21 may be a curved surface.

The laminated body reference surface 21 is smoothly curved so that the height in the Z-axis direction changes in the X-axis direction. Specifically, the laminated body reference surface 21 has a smooth concave shape having the laminated body bottom 21c at substantially the center when viewed from the front in the Y-axis direction. This concave shape corresponds to the concave shape of the shaping die reference surface 11.

In the present embodiment, the following advantageous effects are achieved.

The amount of displacement of the laminated body edge 23 from the shaping die edge 13 increases as a position on the laminated body edge 23 approaches the laminated body bottom 21c from the side end 21b in the concave shape. Thus, when the laminated body bend surface 22 is overlapped on the shaping die bend surface 12, portions closer to the center of the laminated body bend surface 22 are pulled up to the shaping die edge 13 side, and portions closer to the side ends 22b are not pulled up to the shaping die edge 13 side. Thus, insufficiency of the fiber sheet occurring on the laminated body bend surface 22 when the laminated body bend surface 22 is overlapped on the shaping die bend surface 12 can be compensated by the displacement between the shaping die edge 13 and the laminated body edge 23.

Figure 21:
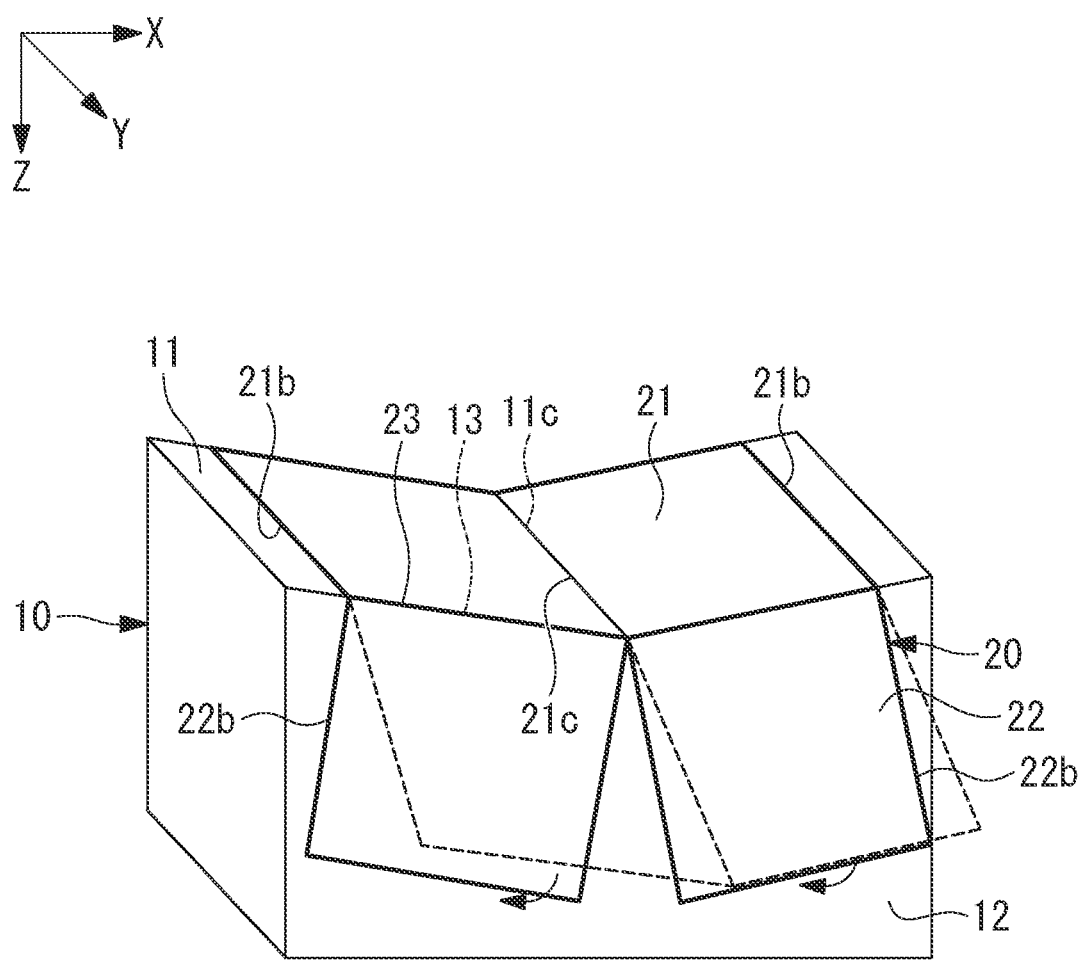
FIG. 21 is a perspective view illustrating a state where a laminated body is placed on the shaping die in a comparative example to the second embodiment of the present disclosure.

As illustrated in FIG. 21, if the shaping die edge 13 and the laminated body edge 23 match, insufficiency of the fiber sheet will occur in the laminated body bend surface 22 compared to the case of the above embodiment when the laminated body bend surface 22 is overlapped on the shaping die bend surface 12. This is because that portions on the center side of the laminated body bend surface 22 are not pulled up to the shaping die edge 13 side.

Further, the distance between the shaping die edge 13 and the laminated body edge 23 at the position x is defined as k×z(x), and it is thus possible to set the distance between the shaping die edge 13 and the laminated body edge 23 based on the distance z(x).

Note that, when the shaping die reference surface 11 and the shaping die bend surface 12 intersect with each other by being connected via an R-part in the first embodiment and the second embodiment as illustrated in FIG. 22, the shaping die edge 13 will be a virtual ridge where the extension line of the shaping die reference surface 11 and the extension line of the shaping die bend surface 12 intersect with each other.

Further, the laminated body reference surface 21 and the laminated body bend surface 22 may be connected via an R-part. In such a case, the laminated body edge 23 is a virtual ridge where the extension line of the laminated body reference surface 21 and the extension line of the laminated body bend surface 22 intersect with each other.

The embodiments described above are understood as follows, for example.

The laminated body (20) according to the first aspect of the present disclosure is a laminated body configured to be overlapped on a shaping die (10) having a shaping die reference surface (11) curved or bent relative to a predetermined direction and a shaping die bend surface (12) intersecting the shaping die reference surface along the predetermined direction. The laminated body is made of a plurality of laminated fiber sheets and includes: a laminated body reference surface (21) curved or bent relative to the predetermined direction and configured to be overlapped on the shaping die reference surface; and a laminated body bend surface (22) intersecting the laminated body reference surface along the predetermined direction and configured to be overlapped on the shaping die bend surface, an angle between the laminated body reference surface and the laminated body bend surface is larger than an angle between the shaping die reference surface and the shaping die bend surface, and when a ridge where the shaping die reference surface and the shaping die bend surface intersect with each other is defined as a shaping die edge (13), and a ridge where the laminated body reference surface and the laminated body bend surface intersect with each other is defined as a laminated body edge (23), the laminated body edge is displaced from the shaping die edge on the shaping die reference surface in a state where the laminated body reference surface is overlapped on the shaping die reference surface.

According to the laminated body of the present aspect, the laminated body edge is displaced from the shaping die edge in a state where the laminated body reference surface is overlapped on the shaping die reference surface. Thus, the laminated body bend surface corresponding to the position of the laminated body edge displaced from the shaping die edge is pulled up to the shaping die edge side when the laminated body bend surface is overlapped on the shaping die bend surface. Accordingly, by adjusting the amount of displacement of the laminated body edge from the shaping die edge to adjust the amount of the pulled-up laminated body bend surface, it is possible to eliminate excess of the fiber sheet or insufficiency of the fiber sheet.

Further, the laminated body according to the second aspect of the present disclosure is such that, in the laminated body according to the first aspect, the shaping die reference surface and the laminated body reference surface are curved or bent in a convex shape relative to the predetermined direction, and in a state where the laminated body reference surface is overlapped on the shaping die reference surface, an amount of displacement of the laminated body edge from the shaping die edge increases as a position on the laminated body edge approaches a side end (21b) from a laminated body top (21a), which is a top of the convex shape.

According to the laminated body of the present aspect, the shaping die reference surface and the laminated body reference surface are curved or bent in a convex shape relative to the predetermined direction, and in a state where the laminated body reference surface is overlapped on the shaping die reference surface, the amount of displacement of the laminated body edge from the shaping die edge increases as a position on the laminated body edge approaches the side end from the laminated body top, which is the top of the convex shape. Thus, when the laminated body bend surface is overlapped on the shaping die bend surface, portions closer to both the side ends of the laminated body bend surface are pulled up to the shaping die edge side, and portions closer to the laminated body top are not pulled up to the shaping die edge side. Accordingly, excess of the fiber sheet occurring on the laminated body bend surface when the laminated body bend surface is overlapped on the shaping die bend surface can be cancelled by the displacement between the shaping die edge and the laminated body edge.

Further, the laminated body according to the third aspect of the present disclosure is such that, in the laminated body according to the first aspect, the shaping die reference surface and the laminated body reference surface are curved or bent in a concave shape relative to the predetermined direction, and in a state where the laminated body reference surface is overlapped on the shaping die reference surface, an amount of displacement of the laminated body edge from the shaping die edge increases as a position on the laminated body edge approaches a laminated body bottom (21c), which is a bottom of the concave shape, from an side end (21b).

According to the laminated body of the present aspect, the shaping die reference surface and the laminated body reference surface are curved or bent in a concave shape relative to the predetermined direction, and in a state where the laminated body reference surface is overlapped on the shaping die reference surface, the amount of displacement of the laminated body edge from the shaping die edge increases as a position on the laminated body edge approaches the laminated body bottom, which is the bottom of the concave shape, from the side end. Thus, when the laminated body bend surface is overlapped on the shaping die bend surface, portions closer to the laminated body bottom of the laminated body bend surface are pulled up to the shaping die edge side, and portions closer to both the side ends are not pulled up to the shaping die edge side.

Accordingly, insufficiency of the fiber sheet occurring on the laminated body bend surface when the laminated body bend surface is overlapped on the shaping die bend surface can be compensated by the displacement between the shaping die edge and the laminated body edge.

Further, the laminated body according to the fourth aspect of the present disclosure is such that, in the laminated body according to the second aspect, a distance between the shaping die edge and the laminated body edge at a position x along the shaping die edge is k×z(x), where z(x) is a distance from the shaping die edge at a shaping die top, which is a top of the convex shape of the shaping die, to the shaping die edge at a position x when viewed from the predetermined direction, and k is a predetermined constant of proportionality.

According to the laminated body of the present aspect, the distance between the shaping die edge and the laminated body edge at the position x is defined as k×z(x), and it is thus possible to set the distance between the shaping die edge and the laminated body edge based on the distance z(x).

Further, the laminated body according to the fifth aspect of the present disclosure is such that, in the laminated body according to the third aspect, a distance between the shaping die edge and the laminated body edge at a position x along the shaping die edge is k×z(x), where z(x) is a distance from the shaping die edge corresponding to a position of the side end to the shaping die edge at a position x when viewed from the predetermined direction, and k is a predetermined constant of proportionality.

According to the laminated body of the present aspect, the distance between the shaping die edge and the laminated body edge at the position x is defined as k×z(x), and it is thus possible to set the distance between the shaping die edge and the laminated body edge based on the distance z(x).

Further, the forming method according to the sixth aspect of the present disclosure is a forming method of overlapping and forming a laminated body made of a plurality of laminated fiber sheets on a shaping die, the shaping die has a shaping die reference surface curved or bent relative to a predetermined direction and a shaping die bend surface intersecting the shaping die reference surface along the predetermined direction, the laminated body has a laminated body reference surface curved or bent relative to the predetermined direction and a laminated body bend surface intersecting the laminated body reference surface along the predetermined direction, and an angle between the laminated body reference surface and the laminated body bend surface is larger than an angle between the shaping die reference surface and the shaping die bend surface. The forming method includes: overlapping the laminated body reference surface on the shaping die reference surface; and bending the laminated body bend surface toward the shaping die bend surface along a bending line extending in the predetermined direction, and when a ridge where the laminated body reference surface and the laminated body bend surface intersect with each other is defined as a laminated body edge, the bending line is displaced from the laminated body edge.

LIST OF REFERENCES 10 shaping die
11 shaping die reference surface
11a shaping die top
11c shaping die bottom
12 shaping die bend surface
13 shaping die edge
20 laminated body
21 laminated body reference surface
21a laminated body top
21b side end
21c laminated body bottom
22 laminated body bend surface
22b side end
23 laminated body edge
30 lamination die
31 lamination surface

What is claimed is:
1. A forming method of overlapping and forming a laminated body made of a plurality of laminated fiber sheets on a shaping die,
   wherein the shaping die has a shaping die reference surface curved or bent relative to a predetermined direction and a shaping die bend surface intersecting the shaping die reference surface along the predetermined direction,
   wherein the laminated body has a laminated body reference surface curved or bent relative to the predetermined direction and a laminated body bend surface intersecting the laminated body reference surface along the predetermined direction, and
   wherein an angle between the laminated body reference surface and the laminated body bend surface is larger than an angle between the shaping die reference surface and the shaping die bend surface,
   the forming method comprising:
      overlapping the laminated body reference surface on the shaping die reference surface; and bending the laminated body bend surface toward the shaping die bend surface along a bending line extending in the predetermined direction, wherein when a ridge formed by directly intersecting and connecting the laminated body reference surface with the laminated body bend surface is defined as a laminated body edge, the bending line is displaced from the laminated body edge, wherein the laminated body reference surface and the laminated body bend surface each have a straight cross section in cut surfaces substantially orthogonal to the predetermined direction, wherein the shaping die reference surface and the laminated body reference surface are curved or bent in a convex shape relative to the predetermined direction, wherein in a state where the laminated body reference surface is overlapped on the shaping die reference surface, an amount of displacement of the laminated body edge from a shaping die edge increases as a position on the laminated body edge approaches a side end from a laminated body top, which is a top of the convex shape, and wherein in a state where the laminated body bend surface is overlapped on the shaping die bend surface, an edge of the laminated body bend surface located opposite the laminated body edge is an edge of the laminated body itself and is located on the shaping die bend surface.

2. The forming method according to claim 1, wherein a distance between the shaping die edge and the laminated body edge at a position x along the shaping die edge is k×z(x), where z(x) is a distance from the shaping die edge at a shaping die top, which is a top of the convex shape of the shaping die, to the shaping die edge at a position x when viewed from the predetermined direction, and k is a predetermined constant of proportionality.

3. A forming method of overlapping and forming a laminated body made of a plurality of laminated fiber sheets on a shaping die, wherein the shaping die has a shaping die reference surface curved or bent relative to a predetermined direction and a shaping die bend surface intersecting the shaping die reference surface along the predetermined direction, wherein the laminated body has a laminated body reference surface curved or bent relative to the predetermined direction and a laminated body bend surface intersecting the laminated body reference surface along the predetermined direction, and wherein an angle between the laminated body reference surface and the laminated body bend surface is larger than an angle between the shaping die reference surface and the shaping die bend surface, the forming method comprising:
overlapping the laminated body reference surface on the shaping die reference surface; and
bending the laminated body bend surface toward the shaping die bend surface along a bending line extending in the predetermined direction, wherein when a ridge formed by directly intersecting and connecting the laminated body reference surface with the laminated body bend surface is defined as a laminated body edge, the bending line is displaced from the laminated body edge, wherein the laminated body reference surface and the laminated body bend surface each have a straight cross section in cut surfaces substantially orthogonal to the predetermined direction, wherein the shaping die reference surface and the laminated body reference surface are curved or bent in a concave shape relative to the predetermined direction, wherein in a state where the laminated body reference surface is overlapped on the shaping die reference surface, an amount of displacement of the laminated body edge from a shaping die edge increases as a position on the laminated body edge approaches a laminated body bottom, which is a bottom of the concave shape, from a side end, and wherein in a state where the laminated body bend surface is overlapped on the shaping die bend surface, an edge of the laminated body bend surface located opposite the laminated body edge is an edge of the laminated body itself and is located on the shaping die bend surface.

4. The forming method according to claim 3, wherein a distance between the shaping die edge and the laminated body edge at a position x along the shaping die edge is k×z(x), where z(x) is a distance from the shaping die edge corresponding to a position of the side end to the shaping die edge at a position x when viewed from the predetermined direction, and k is a predetermined constant of proportionality.

* * * * *